United States Patent [19]
Hirayama

[11] Patent Number: 6,100,878
[45] Date of Patent: Aug. 8, 2000

[54] INFORMATION PROCESSING APPARATUS

[75] Inventor: Tomoshi Hirayama, Tokyo, Japan

[73] Assignee: Sony Corporation, Tokyo, Japan

[21] Appl. No.: 07/978,450

[22] Filed: Nov. 18, 1992

Related U.S. Application Data

[63] Continuation of application No. 07/642,994, Jan. 18, 1991.

[30] Foreign Application Priority Data

Jan. 19, 1990 [JP] Japan .................................. 2-009626

[51] Int. Cl.$^7$ ................................................ G09G 5/00
[52] U.S. Cl. ........................ 345/179; 345/339; 345/348; 345/350
[58] Field of Search .................................. 340/706, 712, 340/707, 721, 720, 723, 798, 799; 395/145–149, 159; 178/18, 19; 345/156, 173, 179, 182, 112, 185, 901, 146, 121, 122, 125, 330, 340, 348, 350

[56] References Cited

U.S. PATENT DOCUMENTS

| | | | |
|---|---|---|---|
| 4,475,239 | 10/1984 | Van Raamsdonk | 340/707 |
| 4,839,634 | 6/1989 | More et al. | 178/18 |
| 4,855,725 | 8/1989 | Fernandes | 340/706 |
| 4,965,558 | 10/1990 | Saki et al. | 345/156 |
| 5,075,675 | 12/1991 | Barker et al. | 340/723 |
| 5,347,628 | 9/1994 | Brewer et al. | 395/159 |

FOREIGN PATENT DOCUMENTS

| | | |
|---|---|---|
| 0 120 977 | 10/1984 | European Pat. Off. . |
| 0 331 329 | 9/1989 | European Pat. Off. . |
| 2193827 | 2/1988 | United Kingdom . |
| WO 89/01658 | 2/1989 | WIPO . |

OTHER PUBLICATIONS

"A Taxonomy of Window Manager User Interfaces", IEEE Computer Graphics and Applications, Sep. 1988, No. 5, pp. 65–84.

"Using MacWrite and MacPaint", Tim Field, pp. 4, 8, 14, 22, 43–47, and 155, 1984.

"WordPerfect", Karen L. Acerson, 1988 pp. 2, 75, 76, 530, 1081.

Primary Examiner—Dennis-Doon Chow
Attorney, Agent, or Firm—Hill & Simpson

[57] ABSTRACT

An information processing apparatus, typically incorporated in a small-size, portable computerized electronic data storage device, has a display unit combined with a tablet which coacts with a stylus to instruct a CPU to process stored information in different modes. When desired pages of information are to be copied or deleted, a displayed icon for a copying or deleting process is touched by the stylus to display a corresponding window on the display unit. The range of pages to be copied or deleted is specified in the displayed window using the stylus. While the desired pages are being copied or deleted, a moving image indicating a visual representation of a copier or a shredder is also displayed.

11 Claims, 35 Drawing Sheets

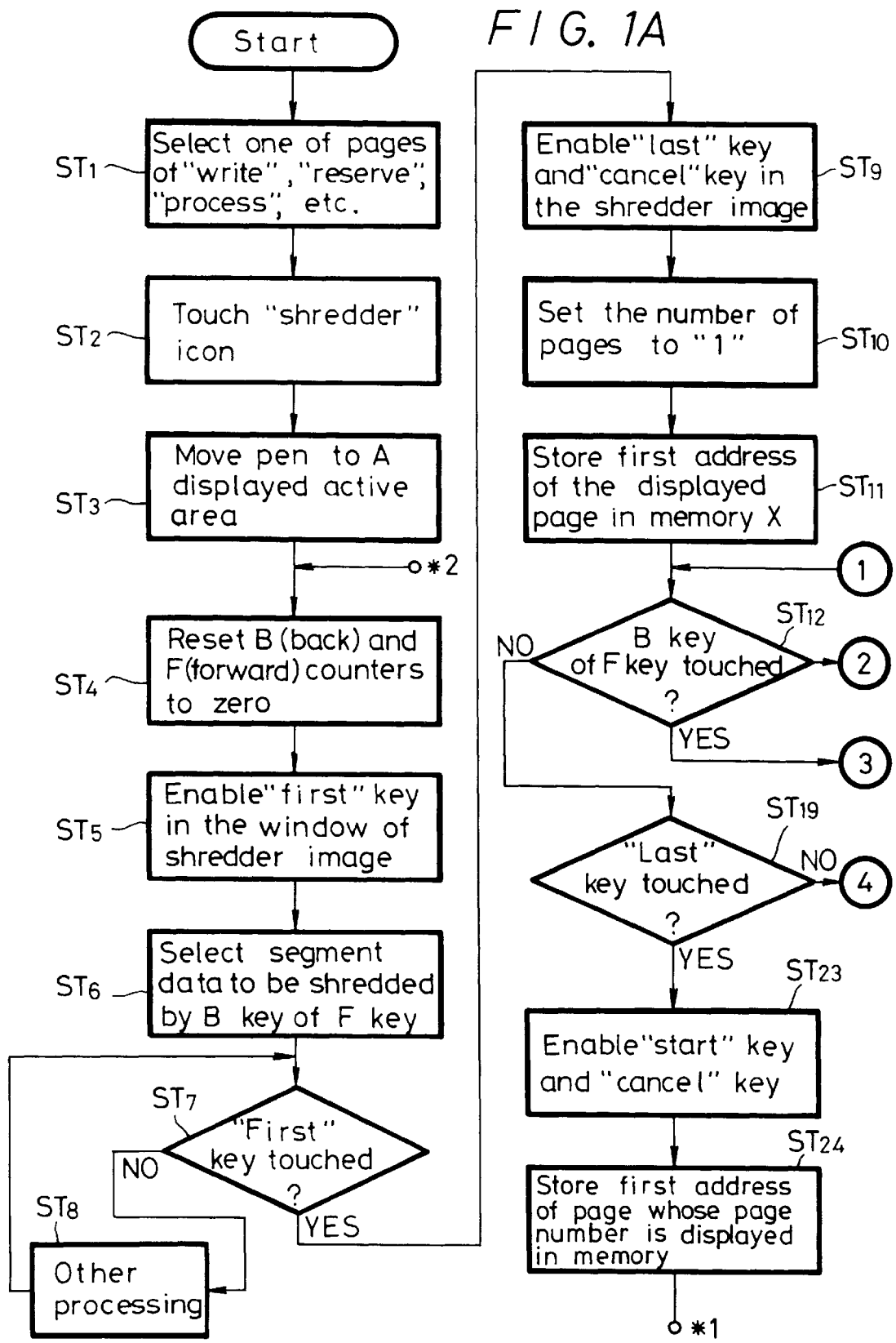

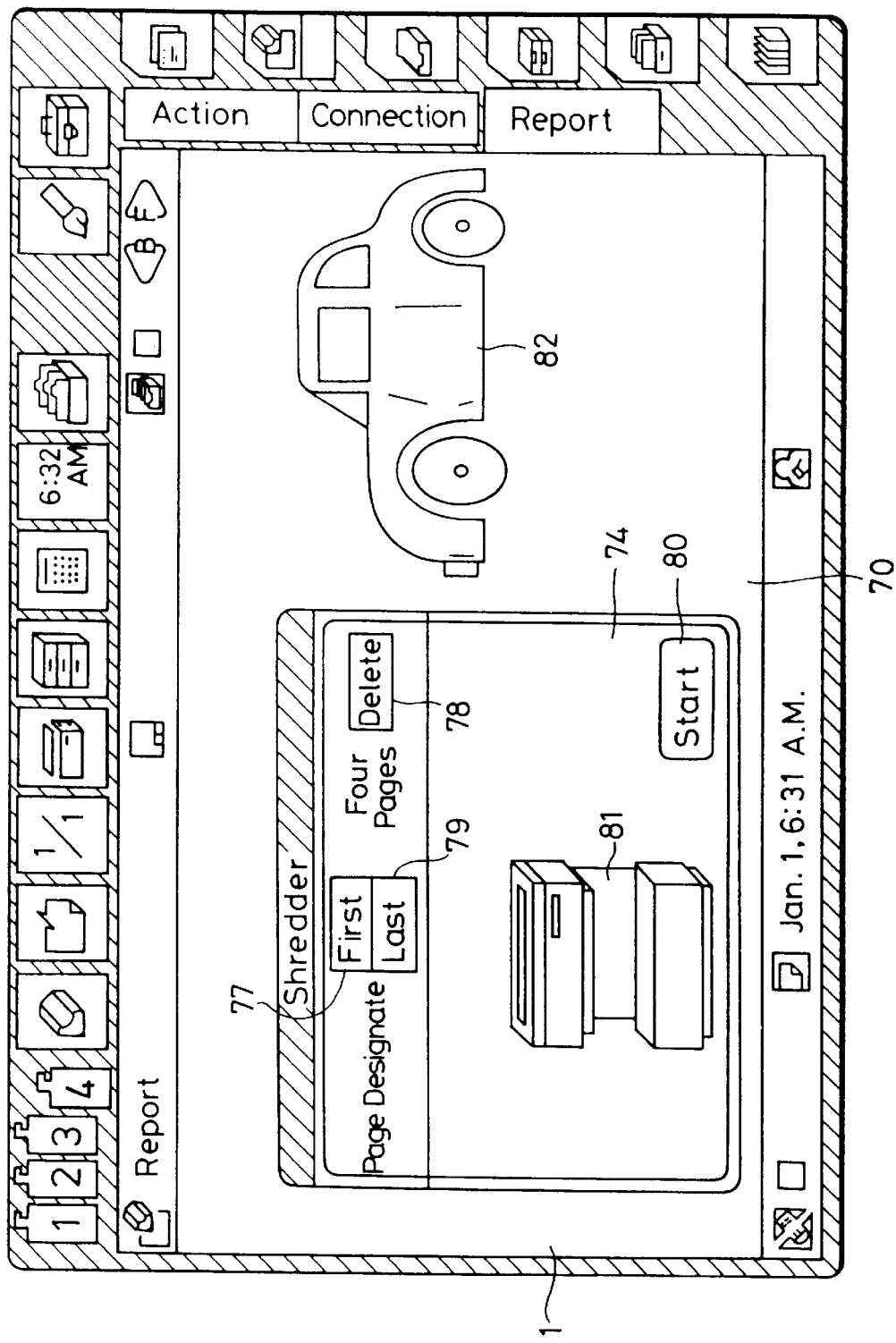

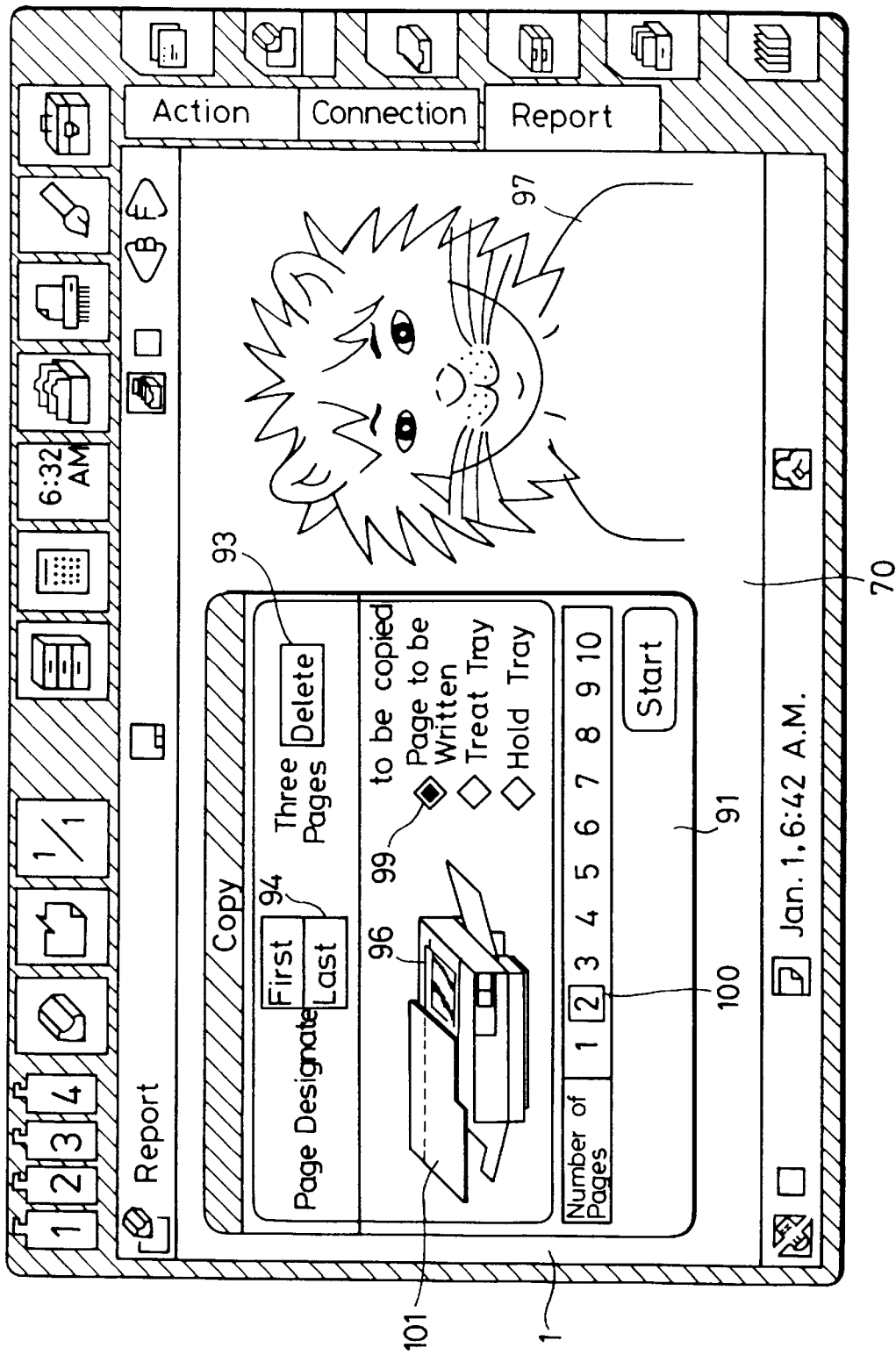

INFORMATION PROCESSING APPARATUS

This is a continuation of application Ser. No. 642,994, filed Jan. 18, 1991.

BACKGROUND OF THE INVENTION

1. Field of the Invention

The present invention relates to an information processing apparatus for effectively retrieving data stored in an electronic data storage device which has a stylus and a tablet for inputting and outputting desired data.

2. Description of the Prior Art

Information processing apparatus for storing divided groups or units of data (hereinafter referred to as "segment data") as fixed-length pages in memories are known in the art. When such an information processing apparatus is in operation, the user specifies and retrieves a desired page of the stored segment data, and displays the retrieved page on a display unit or records the retrieved page on a recording medium. Generally, a page of the stored segment data is identified using a keyboard. To specify a succession of pages, the first page is identified with the keyboard, and then the number of pages following the first page is entered through the keyboard.

However, pages which are desired to be retrieved from the stored segment data cannot be identified in the above manner with information processing apparatus which employ a stylus as the input device.

OBJECTS AND SUMMARY OF THE INVENTION

It is an object of the present invention to provide an information processing apparatus which is capable of identifying successive pages of stored segment data with an instruction inputted using a stylus, and also allows the user to obtain a clear visual confirmation as to how many pages have been specified.

According to the present invention, an information processing apparatus comprising input means for inputting information, memory means for storing the inputted information as a plurality of pages, display means for displaying one of the pages at a time, first indicating means for indicating a first page of stored information to be processed, second indicating means for indicating a last page of stored information to be processed, means for controlling the display means to successively display stored information from the first page toward the final page, and processing means for processing the information ranging from the first page to the last page.

The processing means processes the information in a selected one of a plurality of different selectable processing modes, and the display means displays a window indicating the selected processing mode.

For example, the processing means copies the information ranging from the first page to the last page as different pages in the memory means, and deletes the information ranging from the first page to the last page from the memory means.

The input means comprises a tablet and a stylus which operate in coaction with each other to instruct the processing means to copy or delete the information ranging from the first page to the last page.

The display means displays an image containing a visual representation of the manner in which the processing means processes the information from the first page to the last page. For example, when the information is to be deleted, a shredder is displayed by the display means, and when the information is to be copied, a copier is displayed by the display means.

The above and other objects, features, and advantages of the present invention will become apparent from the following detailed description of illustrative embodiments thereof to be read in conjunction with the accompanying drawings, in which like reference numerals represent the same or similar objects.

BRIEF DESCRIPTION OF THE DRAWINGS

FIGS. 1A, 1B, and 1C are a flowchart of an operation sequence of an information processing apparatus according to an embodiment of the present invention;

FIGS. 5A through 5I and 6A through 6R are plan views showing examples of data processing displayed while the information processing apparatus is in operation.

DETAILED DESCRIPTION OF THE PREFERRED EMBODIMENTS

Figure 3:
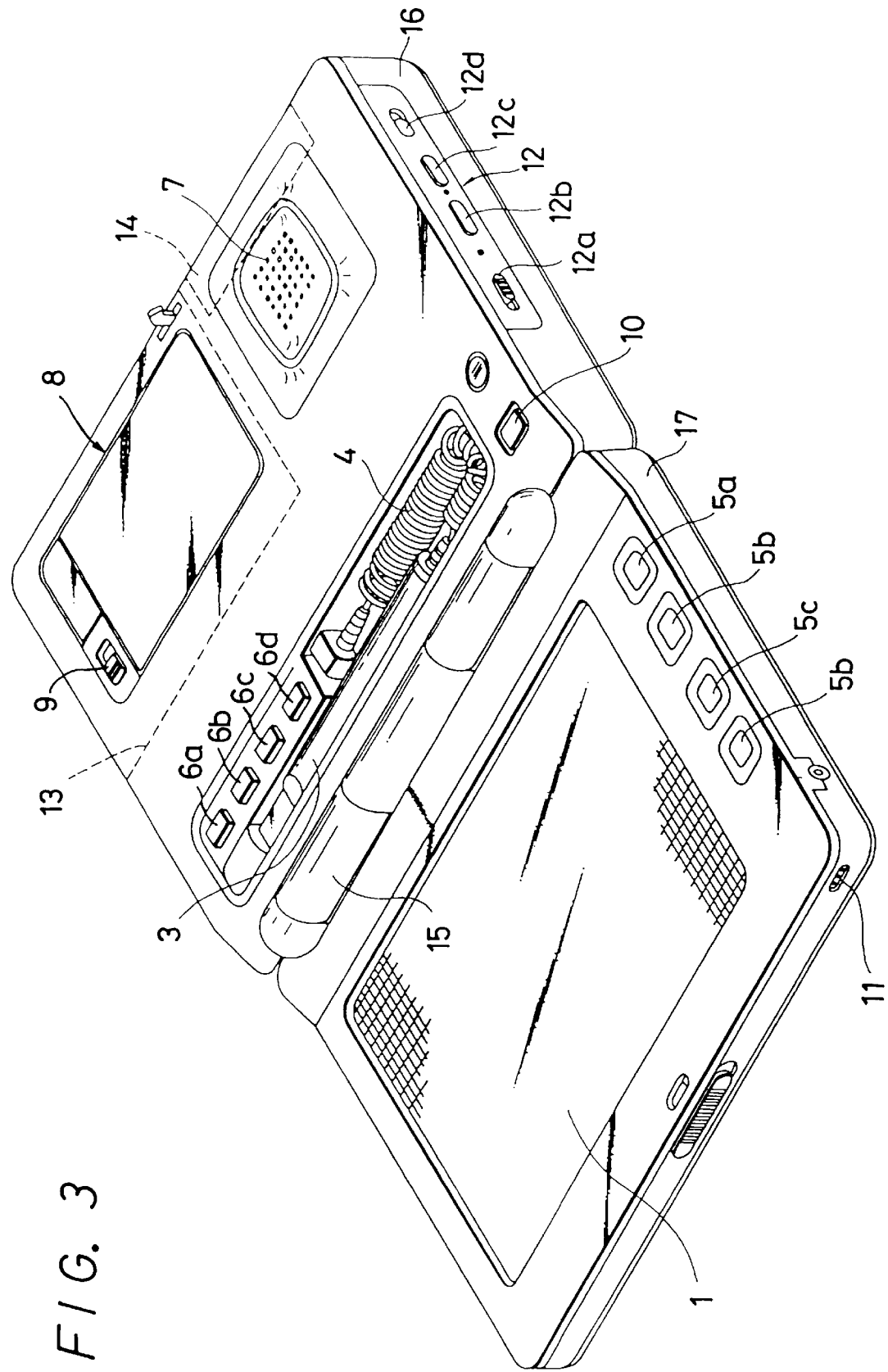
FIG. 3 is a perspective view of a housing assembly of the information processing apparatus.
Figure 4:
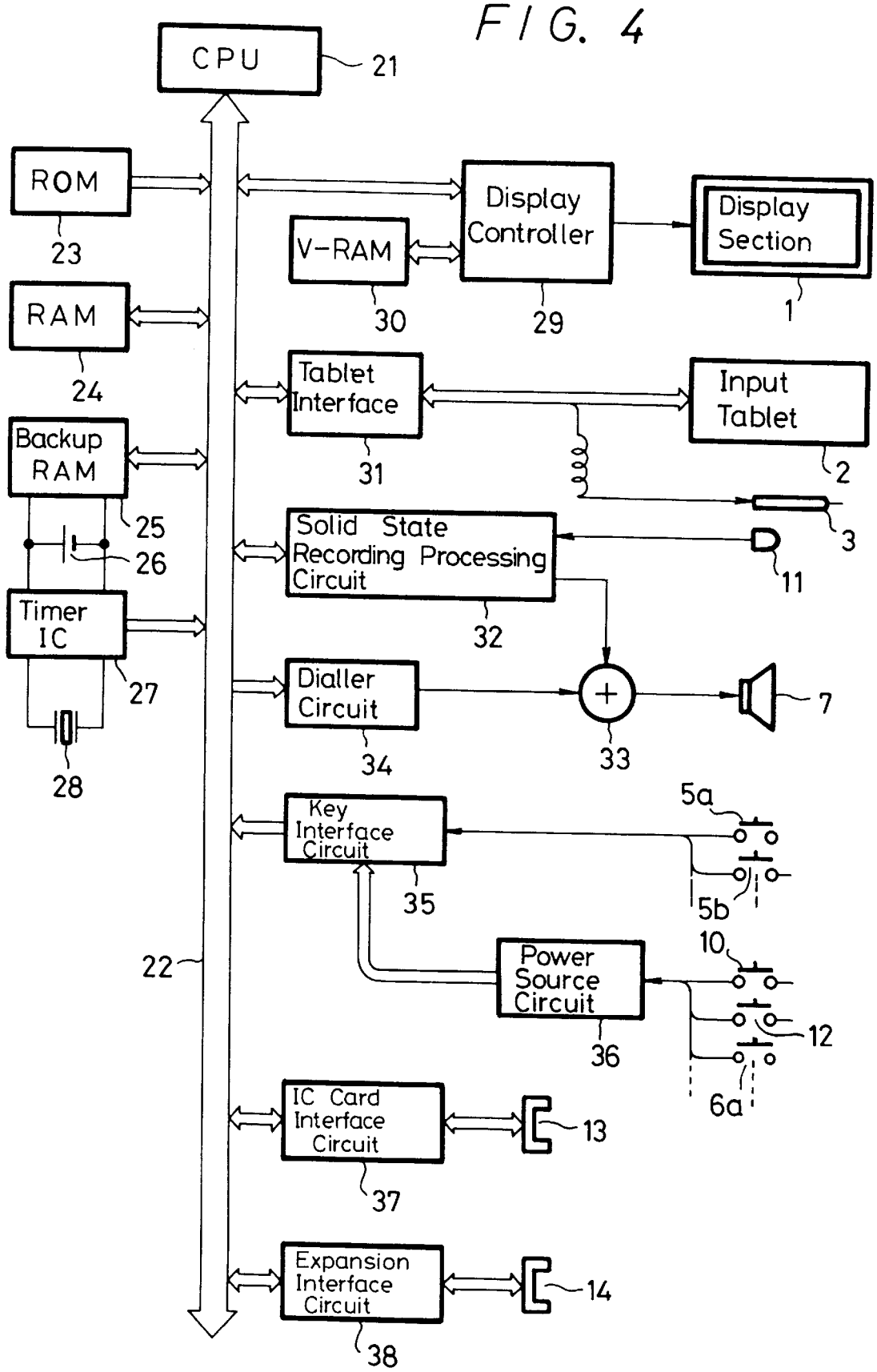
FIG. 4 is a block diagram of the information processing apparatus.

FIGS. 3 and 4 show the hardware arrangement of an information processing apparatus according to the present invention. The information processing apparatus is shown as being incorporated in a small-size, portable computerized electronic data storage device.

As shown in FIG. 3, the electronic data storage device includes a housing assembly comprising a pair of foldable and unfoldable housings 16, 17. The housing 17 has a display unit 1 in the form of a liquid crystal display unit, for example, for displaying image data supplied from a CPU 21 (FIG. 4) or the like. The display unit 1 has on its surface an input tablet 2 which may comprise a transparent touch-sensitive device or the like. A stylus or probe 3, which is usually stored in the other housing 16 when not in use, coacts with the input tablet 2 for inputting desired data into the electronic data storage device. The stylus 3 and the tablet 2 jointly have a detector for detecting a change in the electrostatic capacitance, for example, between the stylus 3 and the tablet 2. When a certain position on the tablet 2 is pointed by the tip of the stylus 3, the coordinates of that position can be detected even without the stylus 3 being in contact with the tablet 2, and a cursor is displayed on the display unit 1 at the position pointed by the tip of the stylus 3.

When the stylus 3 is taken out of the housing 16 and its tip is brought into contact with the tablet 2, information relative to the condition in which the tip of the stylus 3 touches the tablet 2 and the position where the tip 3 of the stylus 3 contacts the tablet 2 is transmitted to the CPU 21, inputting desired data thereinto. The housing 17 supports keyswitches 5a, 5b, 5c, 5d, whereas the housing 16 supports keyswitches 6a, 6b, 6c, 6d. Signals from these keyswitches are also supplied to the CPU 21.

The housing 16 also has a loudspeaker 7 for producing audible signals and a battery case 8 for storing a battery. The battery case 8 is normally closed by a lid which can be opened when it is released by a lock mechanism 9 associated therewith. Various electronic circuits and components in the housings 16, 17 are energized when a power supply switch 10 on the housing 16 is turned on. The housing 11 has a microphone 11 on an outer edge thereof for picking up voice messages to be recorded in a solid-state recording medium. The housing 11 has on a side edge thereof a key pad 12 for recording desired voice messages. The key pad 12 includes a recording key 12a, a playback key 12b, a stop key 12c, and a volume key 12d for adjusting the level of sound to any one of high, medium, and low levels at a time. When the these keys 12a, 12b, 12c, 12d are selectively pushed or shifted, a voice message picked up by the microphone 11 is recorded, or a recorded voice message can be reproduced by the loudspeaker 7.

The housing 16 also has a socket 13 defined in an outer edge thereof for receiving an IC card such as of a ROM, a RAM, or the like therein, and an expansional socket 14 defined in the outer edge thereof for connection to an external device (not shown).

The housings 16, 17 are foldably interconnected by a hinge 15 which includes a flexible board for transmitting signals between the housings 16, 17. Therefore, the housings 16, 17 can be folded together for storage or spread out for use without electric disconnection between electronic circuits and components in the housings 16, 17. For example, the electronic data storage device as it is unfolded has a longitudinal dimension of about 29 cm and a transverse dimension of about 20.5 cm, and has a thickness of about 4 cm when folded. The display unit 1 has a length of about 15 cm and a width of about 10 cm.

The electronic data storage device has an electronic hardware arrangement as shown in FIG. 4. The electronic data storage device includes a CPU 21 to which various components in the form of ICs, etc. are connected through a bus 22.

A ROM 23 which is connected to the bus 22 stores various programs including a system program for controlling operation of the electronic data storage device, a character conversion program for converting Japanese alphabetical characters into Chinese characters in a word processor system, dictionary data for use with the character conversion program, a character recognition program for recognizing handwritten characters, dictionary data for use with the character recognition program, and other data.

A working RAM 24 and a backup RAM 25 coupled to a power supply 26 are also connected to the bus 22.

A timer IC 27, which is also energized by the power supply 26, counts clock pulses generated by a quartz oscillator 28 and constantly produces present data relative to year, month, date, and time.

The display unit 1 shown in FIG. 1 is controlled by a display controller 29 which is controlled by the CPU 21. Display data generated by the CPU 21 are supplied to the display controller 29 and written into a V-RAM 30 through the display controller 29. The display data stored in the V-RAM 30 are then supplied to the display unit 1 under the control of the display controller 29.

The tablet 2 combined with the display unit 1 and the stylus 3 are connected to the bus 22 through a tablet interface 31. Therefore, data which are written on the inlet tablet 2 with the stylus 3 are supplied through the tablet interface 31 to the CPU 21.

A voice signal picked up by the microphone 11 is converted by a solid-state recording processor 32 into a digital signal, which is stored in the backup RAM 25 under the control of the CPU 21. When voice signal data stored in the backup RAM 25 are retrieved, they are converted by the solid-state recording processor 22 into an analog signal, which is supplied through a mixer 33 to the loudspeaker 7.

A dialer 34 produces an audio signal, which corresponds to a dual tone signal of a push-button dialing system, in response to data indicative of a desired telephone number from the CPU 21. The audio signal is supplied from the dialer 34 through the mixer 33 to the loudspeaker 7.

A key interface 35 is supplied with signals from the key switches 5a through 5d, and the key switch associated with the stop key 12c. The key interface 35 converts the supplied signals into signals which are supplied to the CPU 21. Signals from the key switch associated with the power supply switch 10, the key switches 6a through 6d, and the key switches associated with the keys 12a, 12b, 12d are supplied to the interface 35 through a power supply 36. When any one of these key switches is actuated, the power supply 36 is first turned on, and thereafter the signal from the key switch is supplied to the interface 35.

Interfaces 37, 38 for connection to an IC card and an external circuit, respectively, are connected in the sockets 13, 14, respectively.

Now, operation of the electronic data storage device will be described below. First, a process of retrieving and deleting or shredding segment data which have been stored in the V-RAM 30 by the CPU 21 will be described with reference to FIGS. 1A through 1C and 5A through 5I.

Figure 5A:
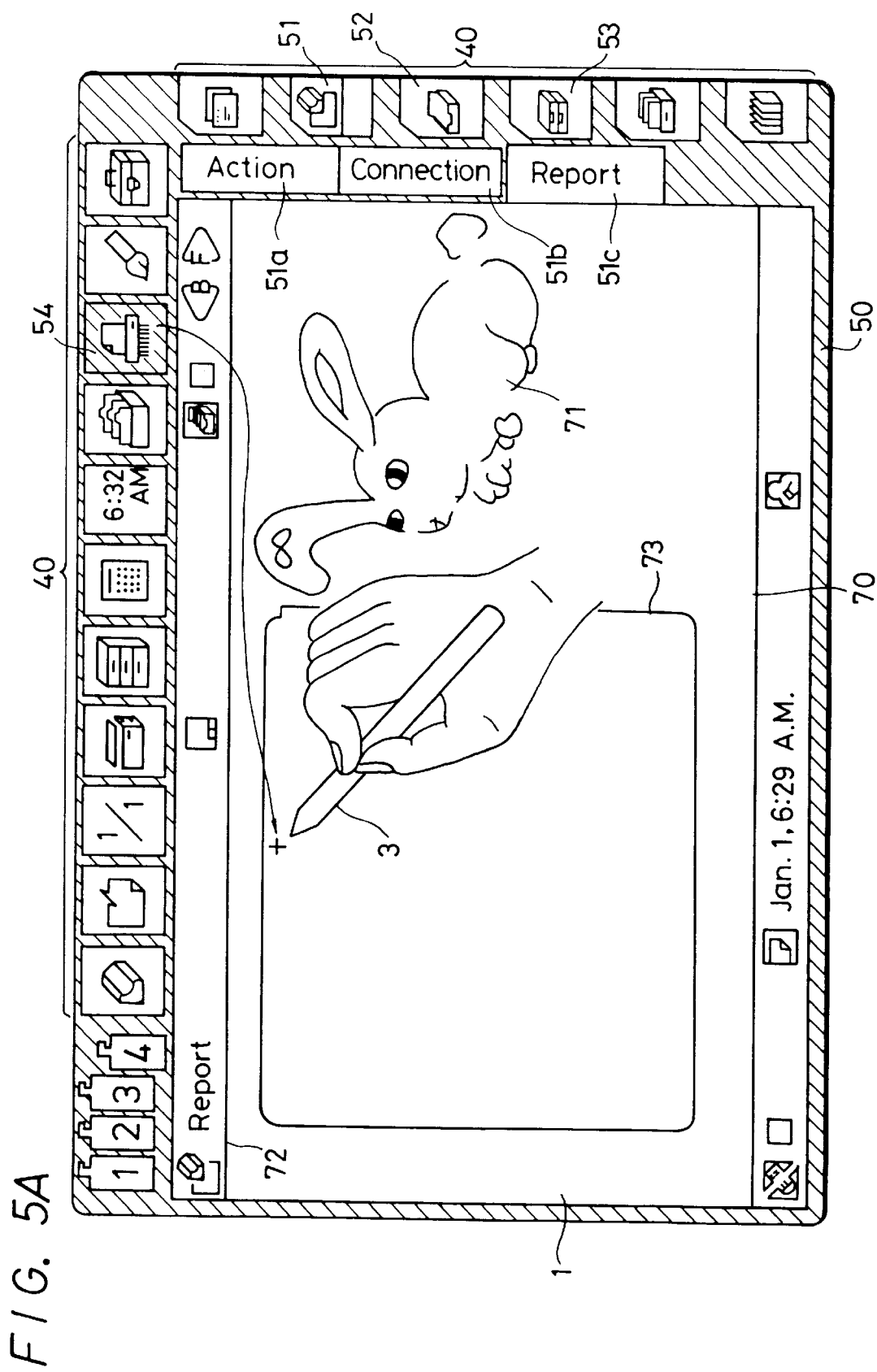

When the power supply switch 10 on the housing 16 is pushed, an array 40 of irons, i.e., graphic symbols on a menu that are accompanied by corresponding characters, is displayed in a hatched area 50 of the screen of the display unit 1 as shown in FIG. 5A.

When the stylus 3 is brought into contact with a "WRITE" iron 51 representing a pencil on a righthand portion of the hatched area 50, characters "ACTION" 51a, "CONNECTION" 51b, and "REPORT" 51c are displayed on an edge of the righthand portion of the hatched area 50 in a step ST1 (FIG. 1A). The characters "ACTION" 51a, "CONNECTION" 51b, and "REPORT" 51c are also displayed when an icon "PROCESS" 52 or "RESERVE" 53 is touched by the stylus 3. Then, the tip of the stylus 3 touches "REPORT" 51c to display a report image 70 on the display unit 1. The user can draw any desired images in the report image 70. At this time, however, it is assumed that the report image 70 contains a rabbit 71 which is stored in a first page of segment data stored in the V-RAM 30 that are to be shredded.

Then, a "SHREDDER" icon 54 is touched by the tip of the stylus 3 in a step ST2. When the tip of the stylus 3 is moved from the "SHREDDER" icon 54 into a displayed active area beyond a line 72 in a step ST3 as shown in FIG. 5A, an enlarged shredder image 74 is displayed in an image frame 73 (FIG. 5A) in the report image 70, the shredder image 74 including the number of pages "0" to be shredded at a position where the tip of the stylus 3 has left off. At the same time, the "SHREDDER" icon 54 is erased. The shredder image 74 also includes a graphic representation 81 of a shredder.

Figure 5B:
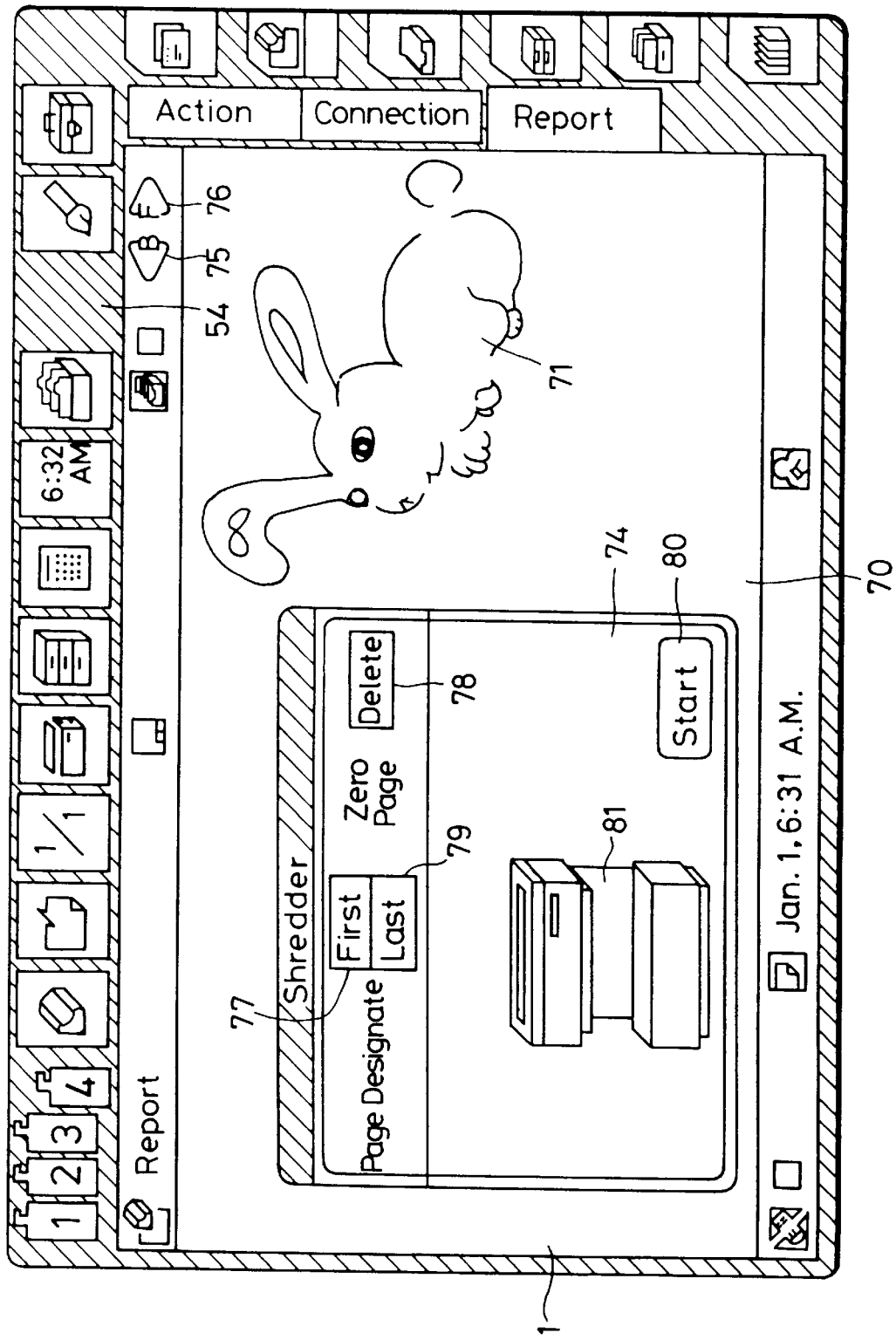

After the step ST3, the CPU 21 resets B (back) and F (forward) page counters to zero in a step ST4. These page counters represent data stored in back and forward areas of the V-RAM 30, and operate when respective B and F keys 75, 76 for turning over pages in the report image 70 as shown in FIG. 5B are touched by the tip of the stylus 3.

In a next step ST5, only a "FIRST" key 77 in the window of the shredder image 74 is enabled, while other keys for indicating pages which are displayed in the window are disabled and covered with halftone dot meshing.

Specifically, a "CANCEL" key 78, "LAST" key 79, and a "START" key 80 are disabled.

The tip of the stylus 3 touches the B key 75 or the F key 76 to select segment data to be shredded in a step ST6. If the B key 75 is touched by the stylus 3 four times, then first through fourth pages of segment data are successively "turned over" in the display unit 1. These pages are successively displayed in the display unit 1 until the fourth page which represents the segment data containing an image 82 of an automobile, for example, is displayed as shown in FIG. 5C. The segment data themselves do not contain page numbers because it would be cumbersome to change, increment, or decrement page numbers in the displayed segment data each time they are deleted.

While the pages are being turned over, the shredder image 74 remains unchanged except the page number. Then, the CPU 21 determines in a step ST7 whether the "FIRST" key 77 is touched by the stylus 3 or not. If not, then control returns through another processing step ST8 to the step ST7 again. If the "FIRST" key 77 is touched by the stylus 3 in the step ST7, then control goes to a step ST9 in which the "LAST" key 79 and the "CANCEL" key 78 in the shredder image 74 are enabled. The number of pages to be shredded is set to "1" in a step ST10, and then the first address of the displayed page is stored in a memory X in a step ST11. Thereafter, the CPU 21 determines in a step ST12 whether the B key 75 or the F key 76 is touched by the stylus 3 or not. If the B key 75 is touched by the stylus 3, then the displayed segment or page number is decremented by 1 in a step ST13 (FIG. 1B), and the B counter associated with the B key 75 is incremented by 1 in a step ST14. Then, the sum of 1 and the absolute value |B−F| representing the difference between the counts of the B and F counters is displayed as the page number in a step ST15. Control then goes from the step ST15 back to the step ST12. If the F key 76 is touched by the stylus 3 in the step ST12, then the displayed segment or page number is incremented by 1 in a step ST16, and the F counter associated with the F key 76 is incremented by 1 in a step ST17. Then, the sum of 1 and the absolute value |B−F| representing the difference between the counts of the B and F counters is displayed as the page number in a step ST18. Control then goes from the step ST18 back to the step ST12.

Figure 1B:
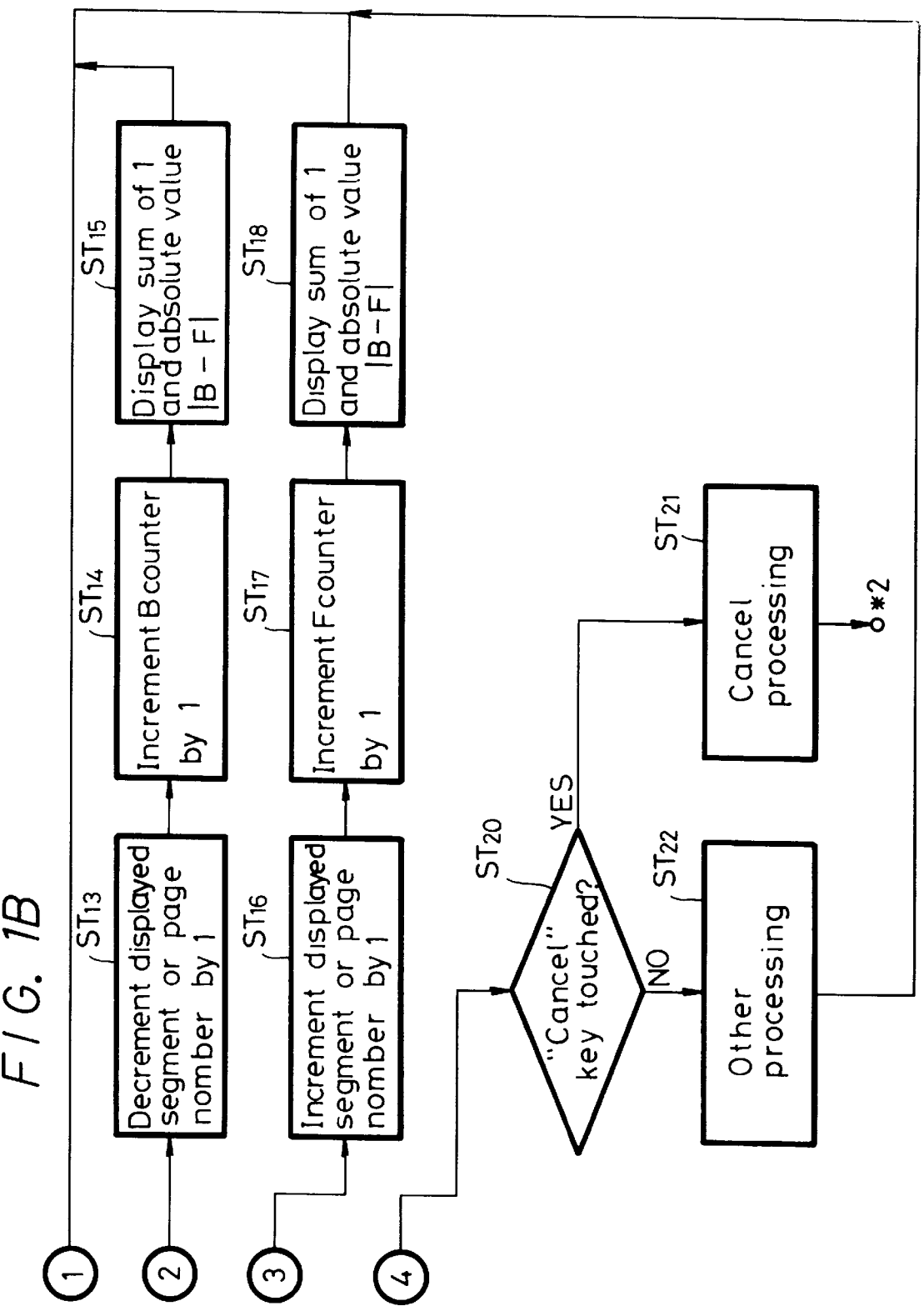
Figure 1C:
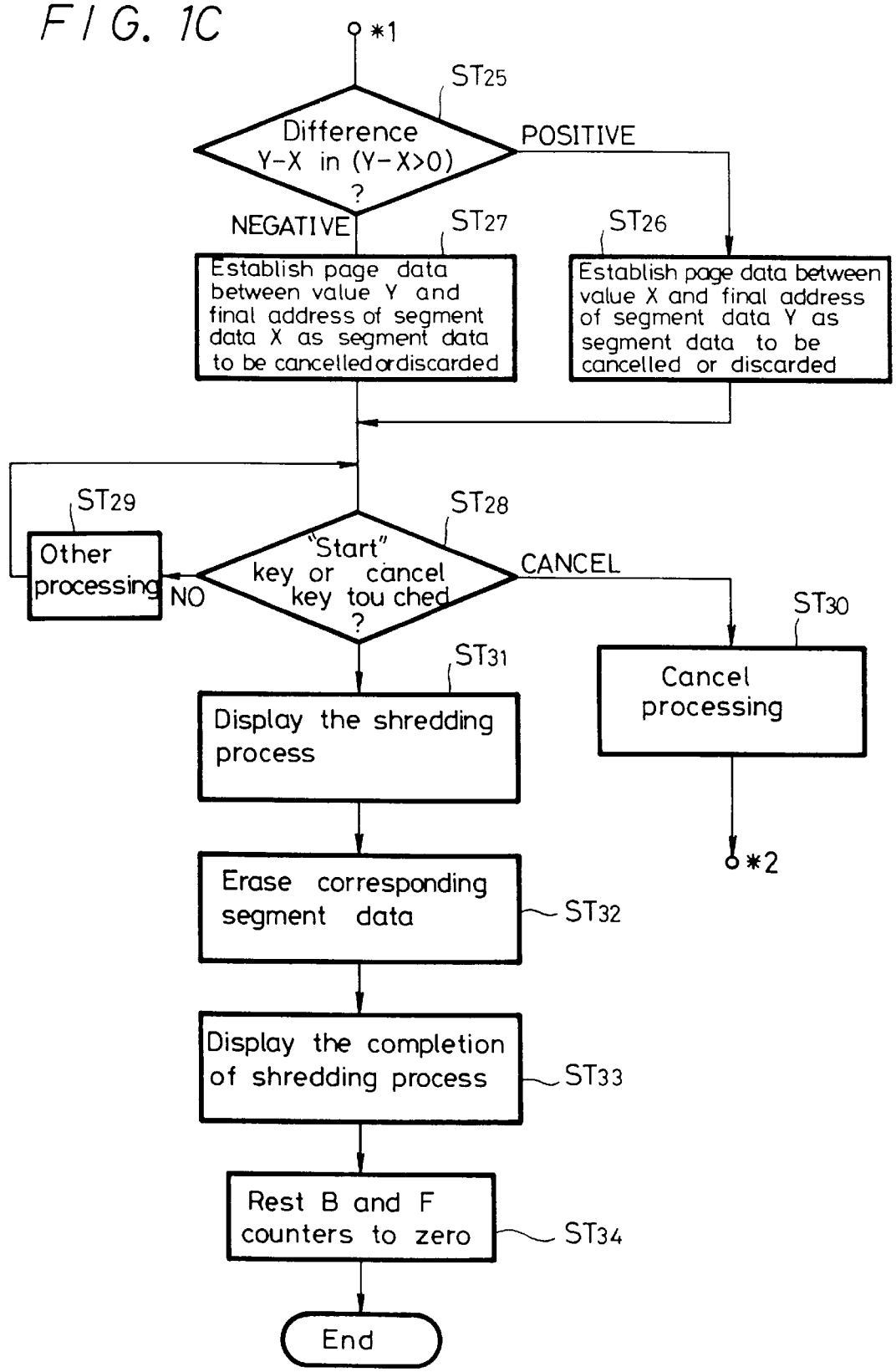

If neither the B key 75 nor the F key 76 is touched by the stylus 3 in the step ST12, then the CPU 21 determines in a step ST19 (FIG. 1A) whether the "LAST" key 79 is touched by the stylus 3 or not. If not, then the CPU 21 determines in a step ST20 (FIG. 1B) whether the "CANCEL" key 78 is touched by the stylus 3 or not. If the "CANCEL" key 78 is touched by the stylus 3, then the process is canceled in a step ST21. After the step ST21, control returns to the step ST4. If the "CANCEL" key 78 is not touched by the stylus 3 in the step ST20, then control goes through another processing step ST22 back to the step ST12. If the "LAST" key 79 is touched by the stylus 3 in the step ST19, then only the "START" key 80 and the "CANCEL" key 78 are enabled in a step ST23 (FIG. 1A). Then, the CPU 21 stores the first address of the page whose page number is displayed in the shredder image 74 in a memory Y in a step ST24. The CPU 21 determines in a step ST25 (FIG. 1C) whether the difference Y−X between the first addresses in the memories X, Y is positive (Y−X>0) or not. If the difference Y−X is positive, then the page data between the value X in the X memory and the final address of the segment data starting with the value Y in the memory Y are established as the segment data to be canceled or discarded in a step ST26. If the difference Y−X is negative, then the page data between the value Y in the memory Y and the final address of the segment data starting with the value X in the memory X are established as the segment data to be canceled or discarded in a step ST27.

The steps ST26, ST27 are described in more detail below. If, for example, successive second, third, and fourth segment data or pages among first through fifth segment data or pages are to be canceled or discarded, then the first address (i.e., "9020") of the second page is stored in the memory X in the step ST11, and the first address of the fourth page (i.e., "9080") is stored in the memory Y in the step ST24. The step ST25 determines whether Y−X=9080−9020=60 is positive or not. If the difference Y−X is positive in the step ST26, the segment data or page data between the value X, i.e., the first address 9020 of the second page and the final address of the page starting with the value Y, i.e., the first address 9080 of the fourth page are established as the pages to be canceled or shredded. Therefore, the second, third, and fourth pages are established as the pages to be canceled or shredded. If the difference Y−X is negative in the step ST27, then the fourth, third, and second pages are set as the pages to be canceled or shredded.

Figure 5D:
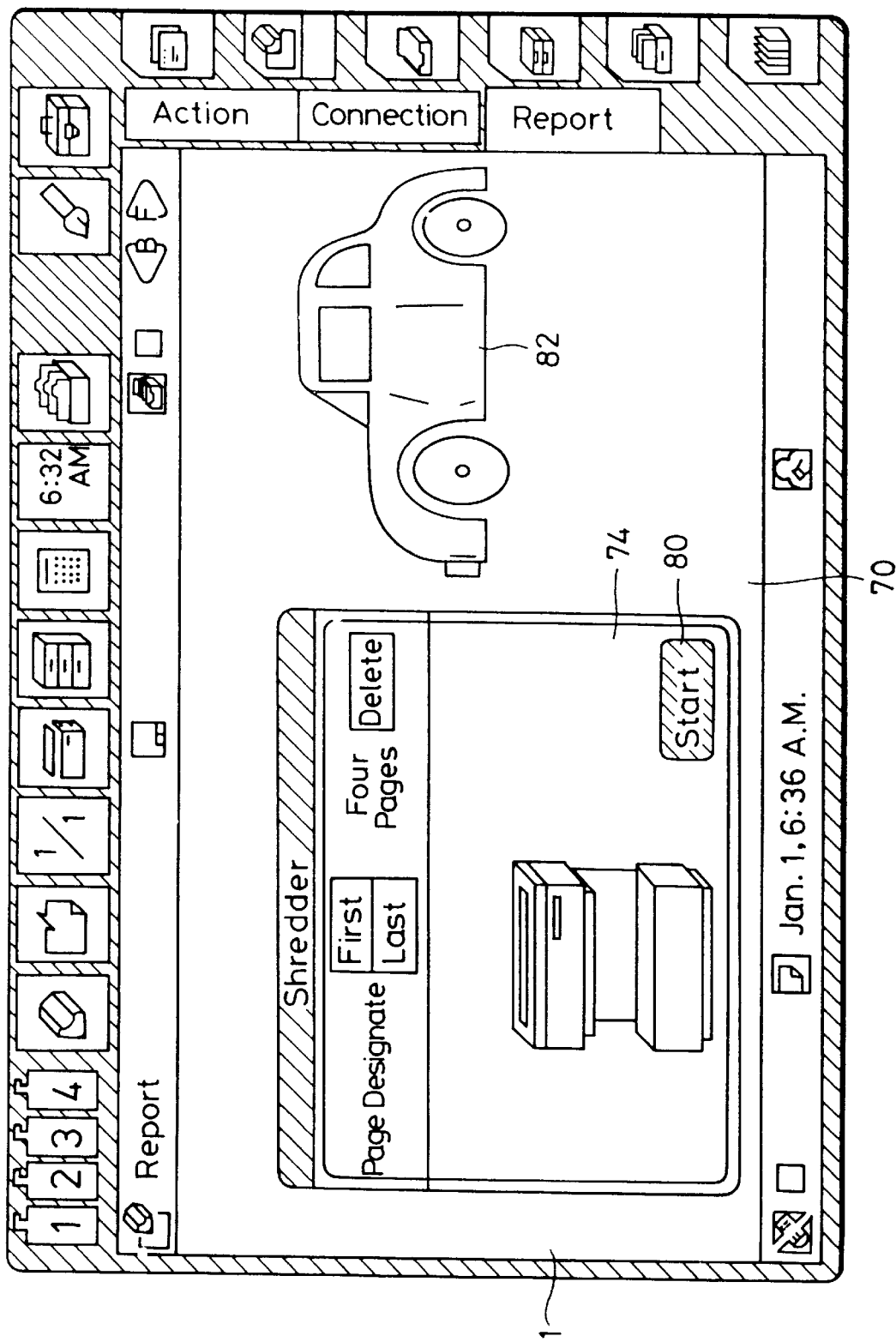
Figure 5E:
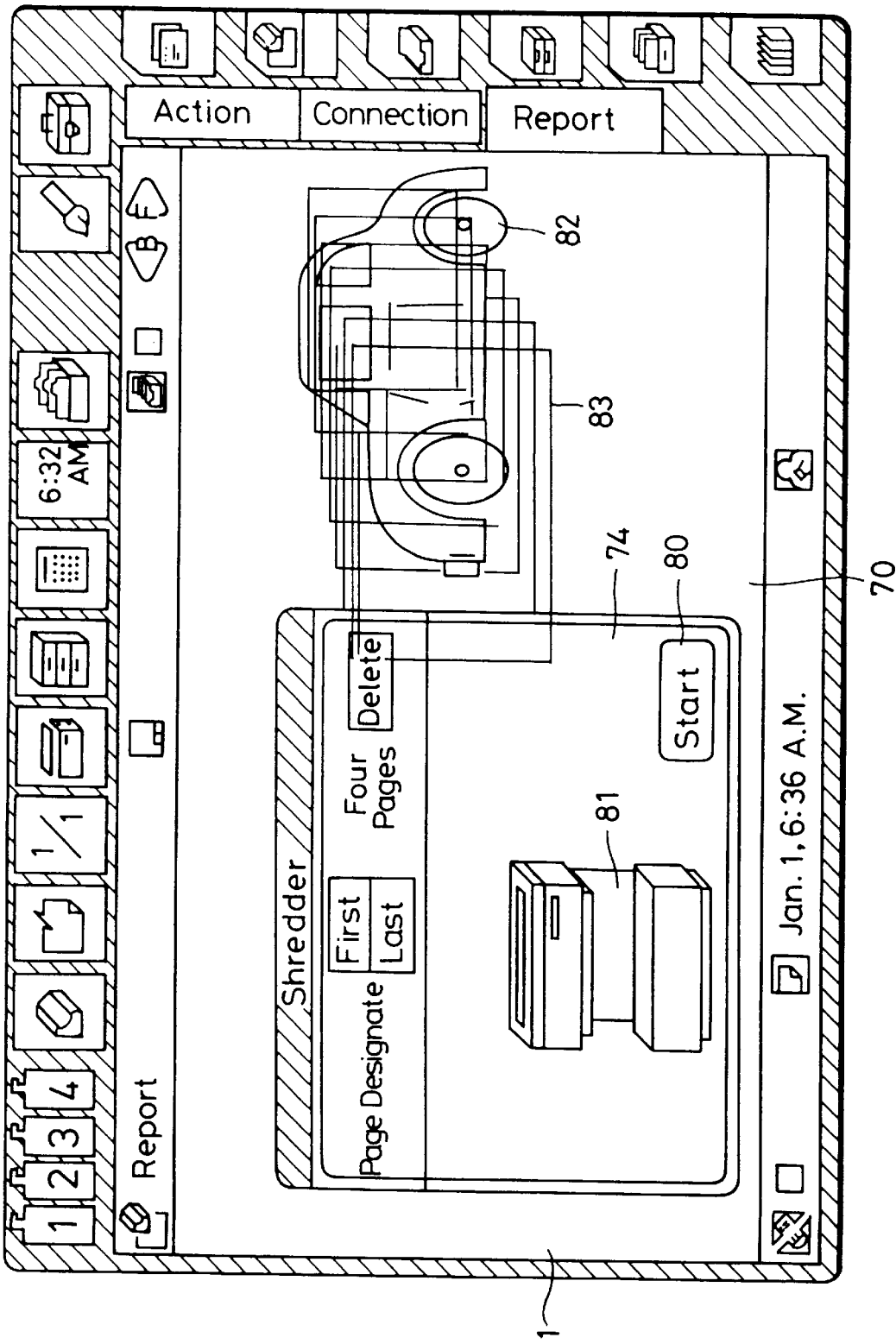
Figure 5F:
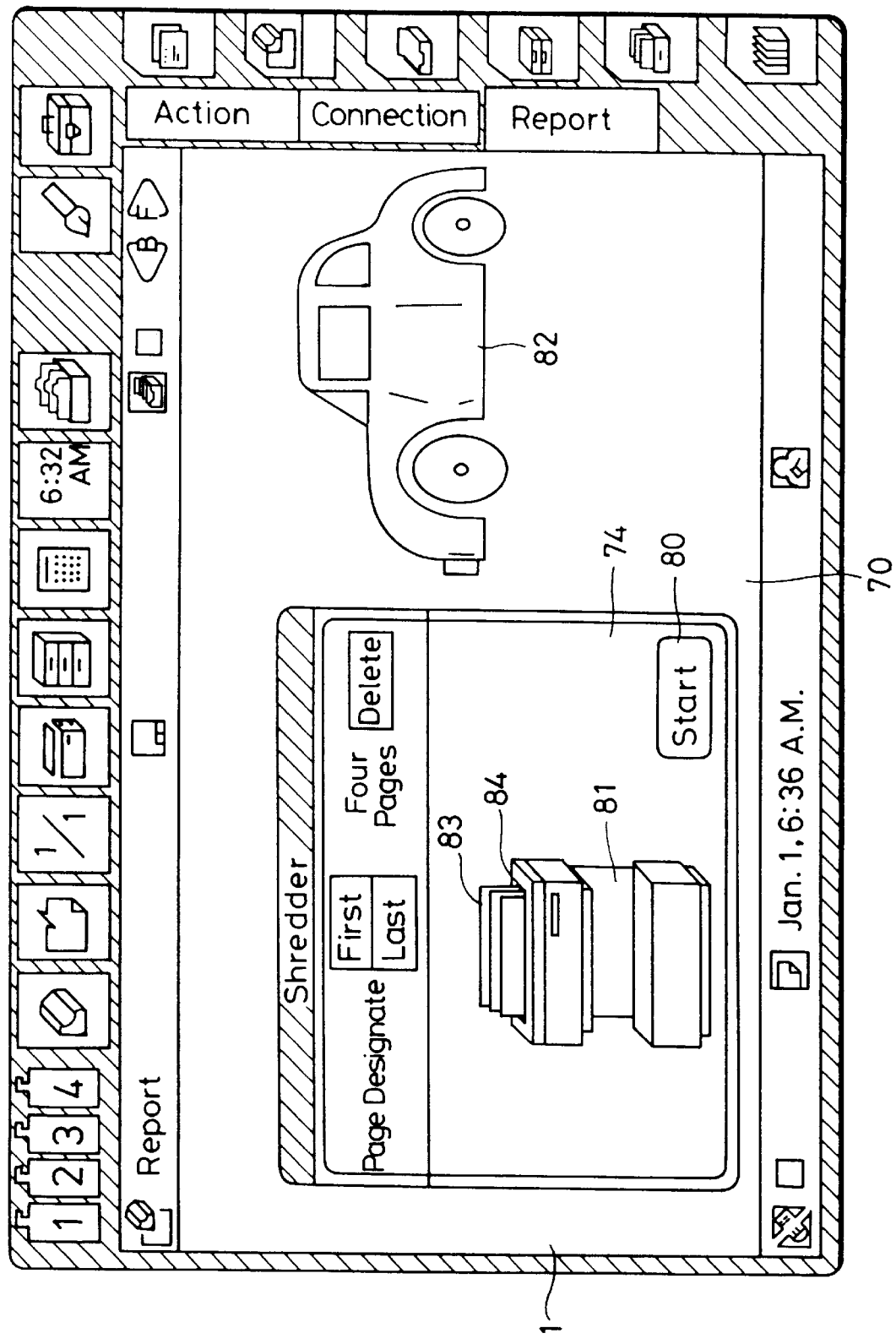
Figure 5G:
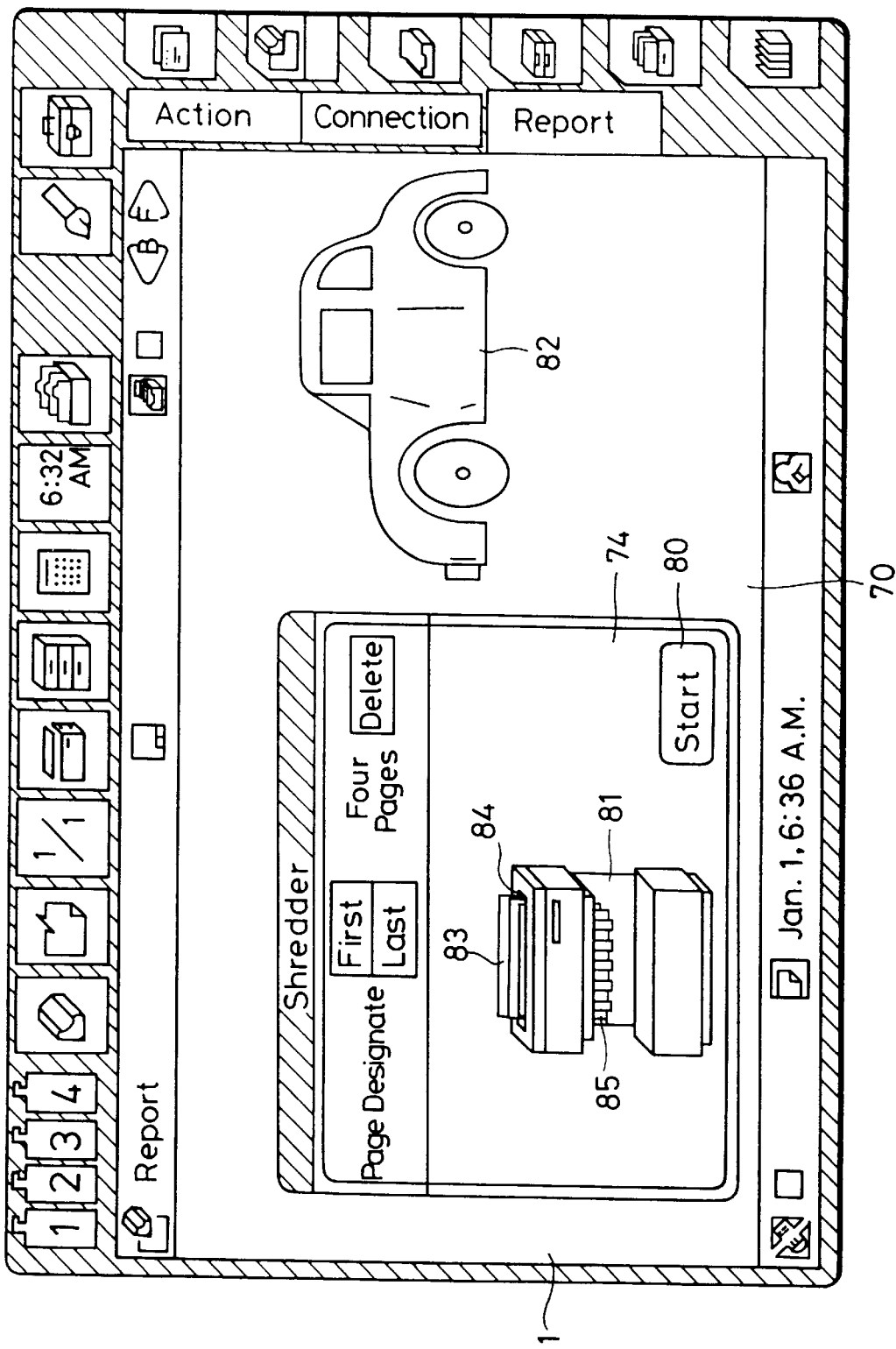
Figure 5H:
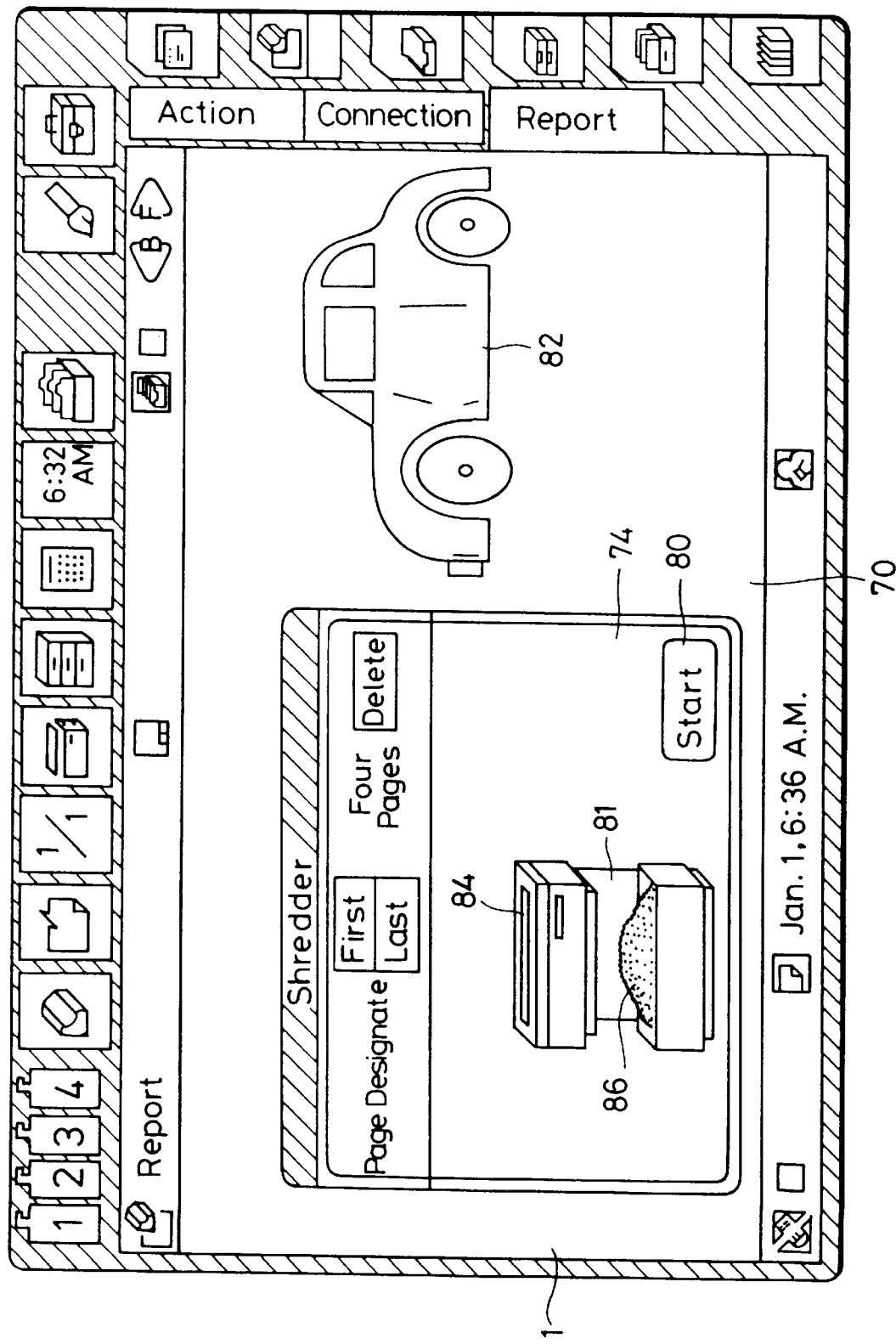
Figure 5I:
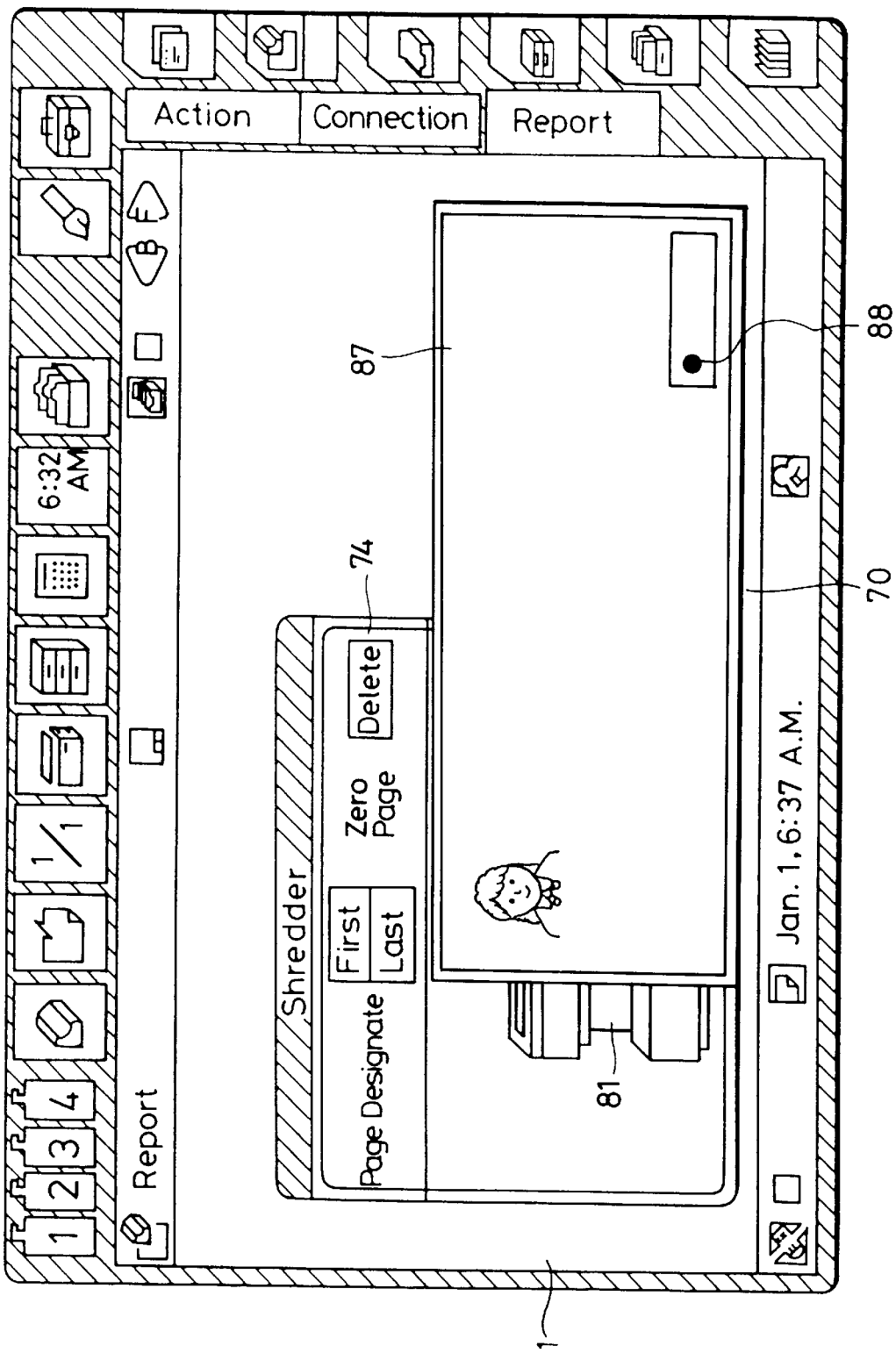

After the successive segment data to be shredded are specified in the step ST26 or ST27, e.g., after the second through fourth pages to be shredded are identified, the CPU 21 determines in a step ST28 whether the key touched by the stylus 3 is the "START" key 80 or the "CANCEL" key 78. If either the key 78 or the key 80 is not touched by the stylus 3, then the CPU 21 executes another processing step ST29 and executes the step ST28 again. If the "CANCEL" key 78 is touched by the stylus 3 in the step ST29, then the process is canceled in a step ST30, after which control returns to the step ST4. If the "START" key 80 is touched by the stylus 3 in the step ST28, the "START" key 80 is displayed in a hatched mode, indicating that the "START" key 80 is activated, as shown in FIG. 5D. The shredding process now starts to be executed. As shown in FIG. 5E, the display unit 1 displays segment data 83, to be successively shredded, as they move from the "WRITE" icon 51 toward the displayed shredder 81 in the shredder image 74. The displayed segment data 82 are then put into a slot 84 of the displayed shredder 81 as shown in FIG. 5F, and cut into small shredded pieces 85 as shown in FIG. 5G. The displayed shredded pieces 85 are then placed in a container 86 as shown in FIG. 5H. These images are successively displayed to allow the user to obtain a clear visual confirmation of the shredding of the segment data 83. The shredding process which is being executed is displayed as described above in a step ST31. Then, the corresponding segment data stored in the memory are erased in a step ST32, and a message 87 indicating that the shredding process is completed is displayed as shown in FIG. 5I in a step ST33. When the user puts the stylus 3 into contact with a displayed "CONFIRM" key 88, the B and F counters are reset to zero in a step ST34. The program for the shredding process now comes to an end.

A process of retrieving and copying a desired succession of segment data or pages from the stored segment data will be described below with reference to FIGS. 2A through 2C and 6A through 6R.

Figure 6A:
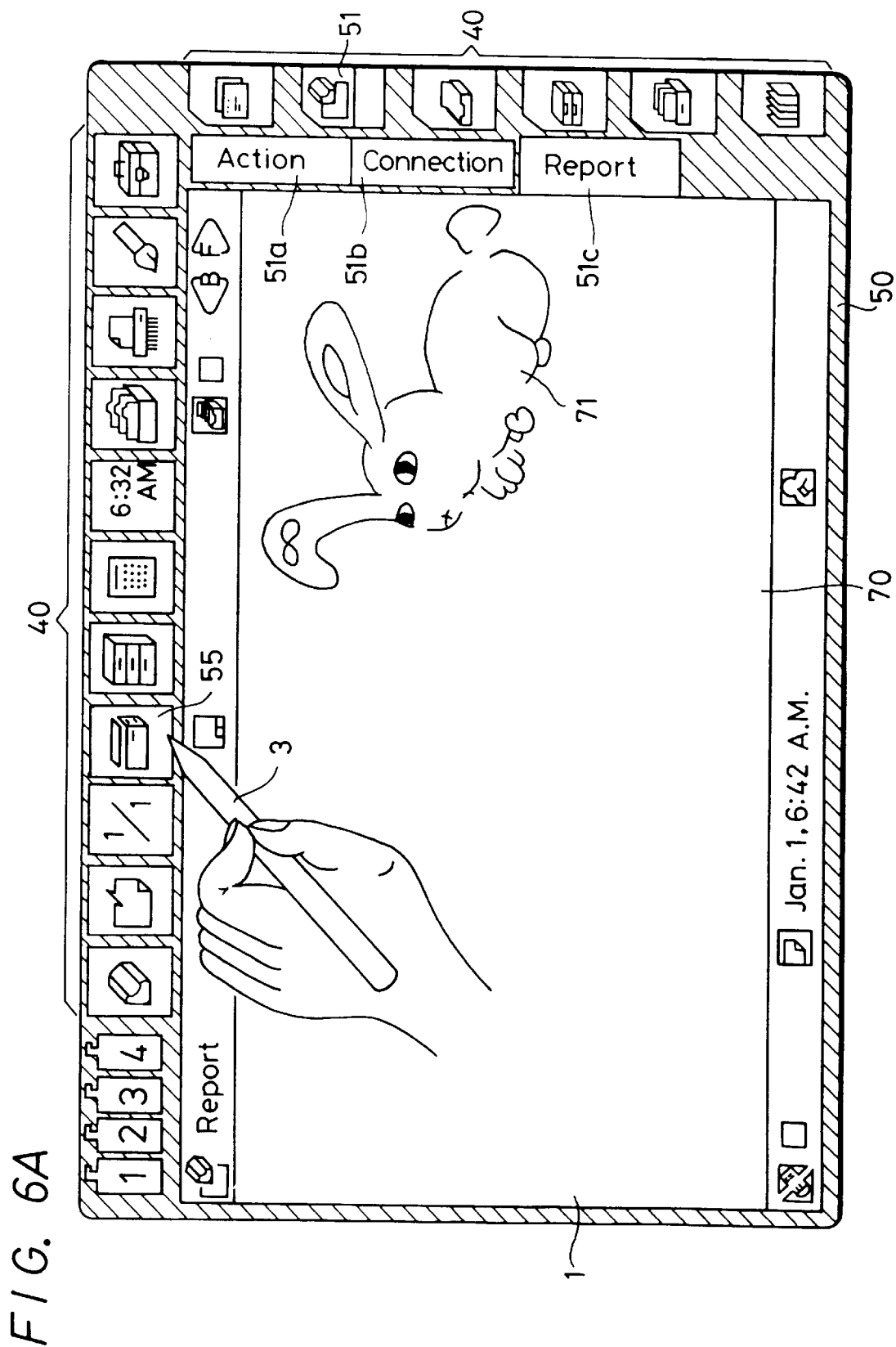

When the power supply switch 10 on the housing 16 is pushed, the array 40 of irons is displayed in the hatched area so of the screen of the display unit 1 as shown in FIG. 6A.

When the stylus 3 is brought into contact with the "WRITE" iron 51 on the righthand portion of the hatched area 50, the characters "ACTION" 51*a*, "CONNECTION" 51*b*, and "REPORT" 51*c* are displayed on the edge of the righthand portion of the hatched area 50 in a step STE1 (FIG. 6A).

When the tip of the stylus 3 touches "REPORT" 51c to display a report image 70 on the display unit 1. The user can draw any desired images in the report image 70. At this time, however, it is assumed that the report image 70 contains a rabbit 71 which is stored in a first page of segment data stored in the V-RAM 30 that are to be copied.

Figure 6B:
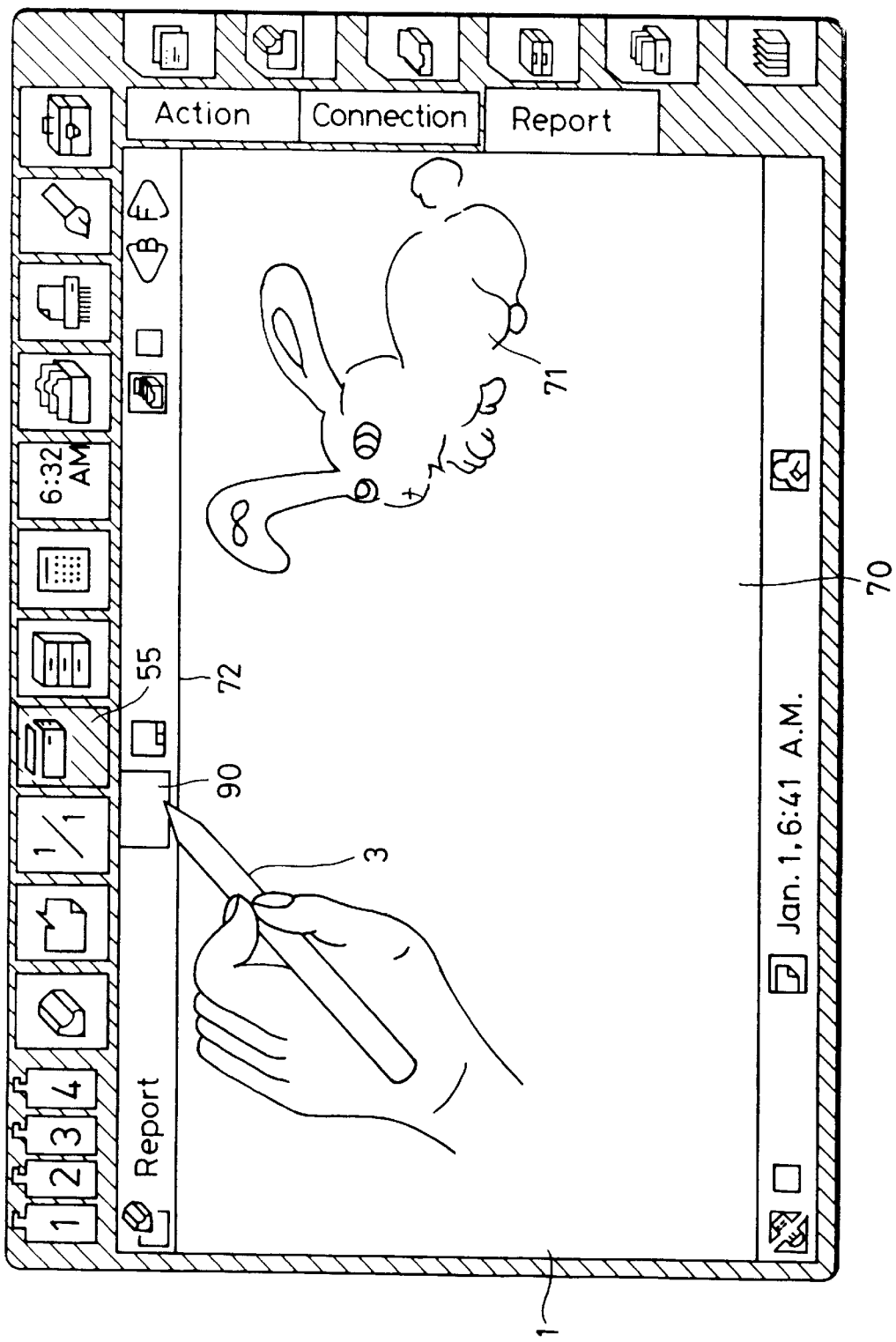
Figure 6C:
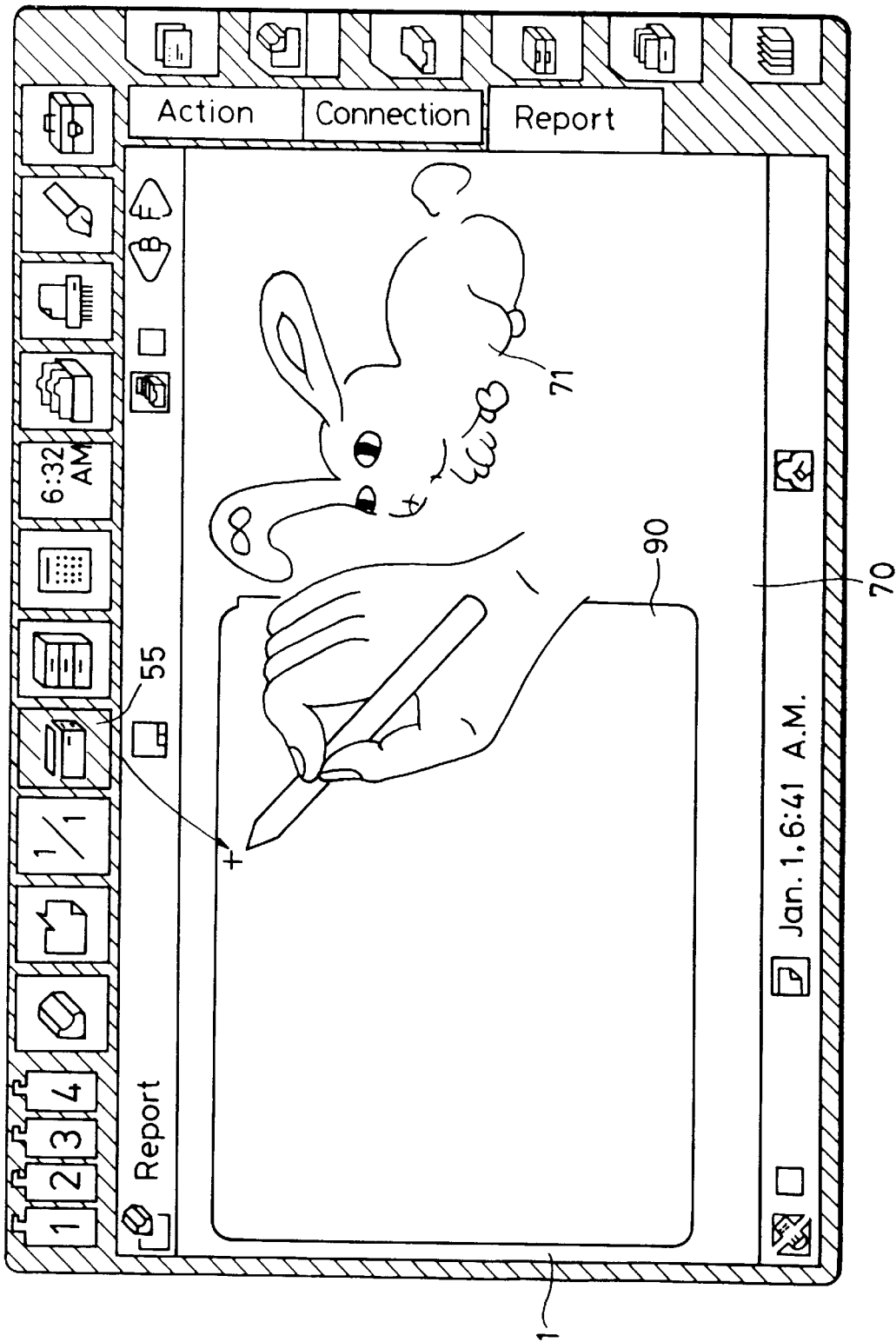

Then, a "COPY" icon 55 is touched by the tip of the stylus 3 in a step STE2, as shown in FIG. 6A. As shown in FIG. 6B, a copying window remains small in size in an area positioned above the line 72. When the tip of the stylus 3 is moved into an active area beyond the line 72 in a step STE3 as shown in FIG. 6B, the copying window is enlarged and displayed as a copy image 91 in an image frame 90 (FIG. 6C) in the report image 70, the copy image 91 including the number of pages "0" to be shredded at a position where the tip of the stylus 3 has left off. At the same time, the "COPY" icon 54 is erased. The copy image 91 also includes a graphic representation 96 of a copier.

Figure 6D:
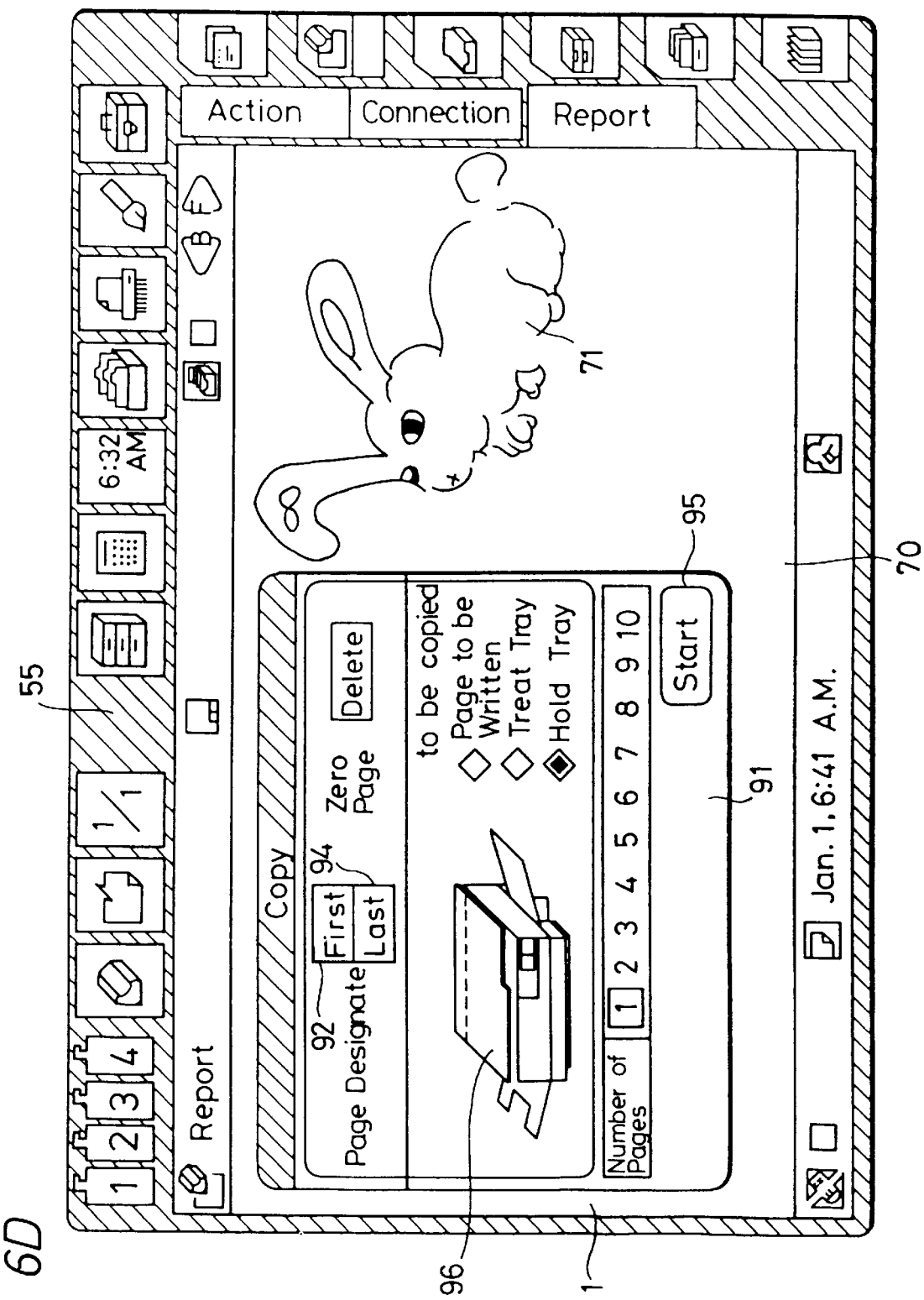

After the step STE3, the CPU 21 resets the B (back) and F (forward) page counters to zero in a step STE4. These page counters represent data stored in back and forward areas of the V-RAM 30, and operate when respective B and F keys 75, 76 for turning over pages in the report image 70 as shown in FIG. 6D are touched by the tip of the stylus 3.

In a next step STE5, only a "FIRST" key 77 in the window of the copy image 91 is enabled, while other keys for indicating pages which are displayed in the window are disabled and covered with halftone dot meshing. Specifically, a "CANCEL" key 93, "LAST" key 94, and a "START" key 95 are disabled.

The tip of the stylus 3 touches the B key 75 or the F key 76 to select segment data to be copied in a step STE6. If the B key 75 is touched by the stylus 3 three times, then first through three pages of segment data are successively "turned over" in the display unit 1. These pages are successively displayed in the display unit 1 until the third page which represents the segment data containing an image 97 of a lion, for example, is displayed as shown in FIG. 6G. The segment data themselves do not contain page numbers because it would be cumbersome to change, increment, or decrement page numbers in the displayed segment data each time they are discarded.

Figure 6E:
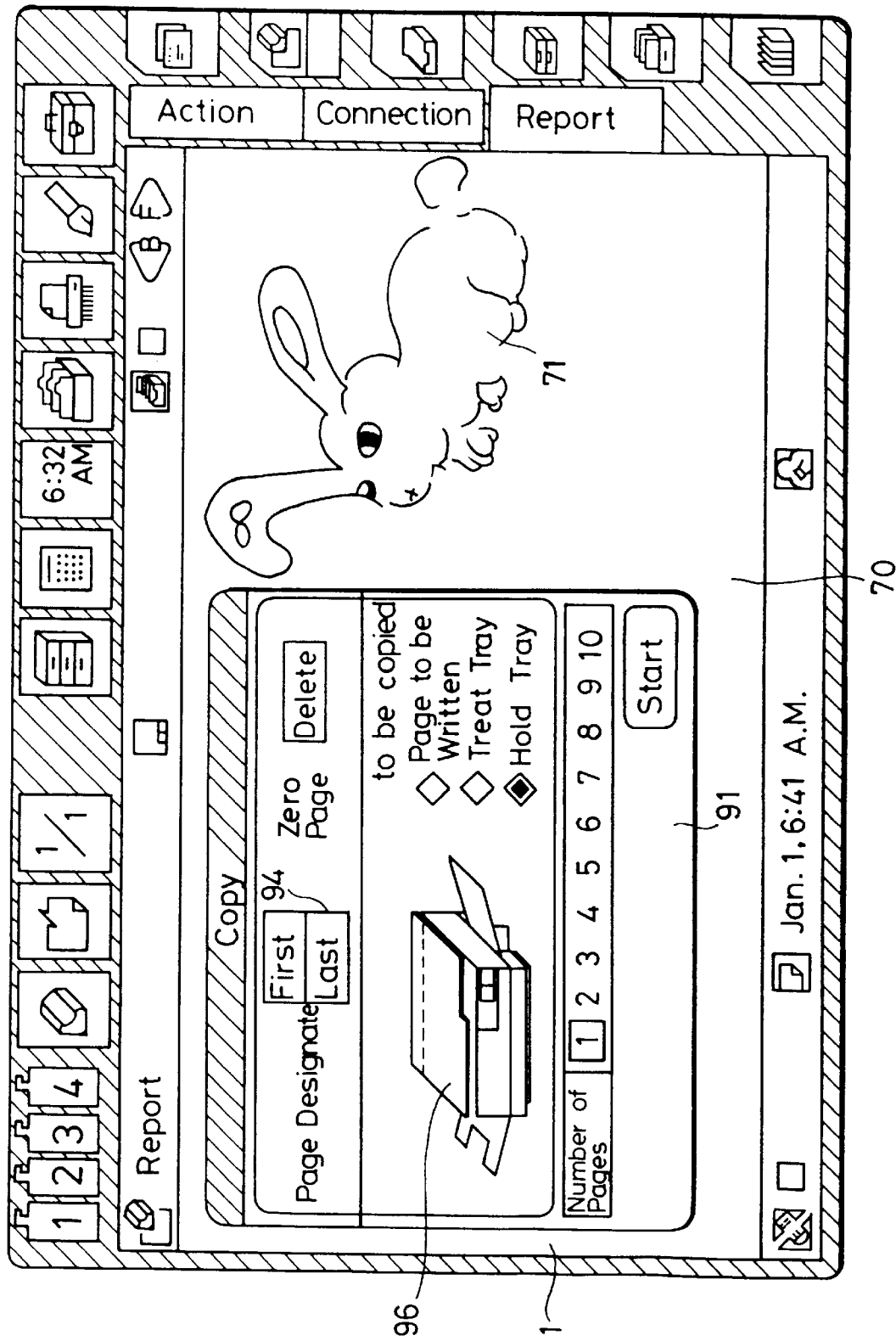
Figure 6F:
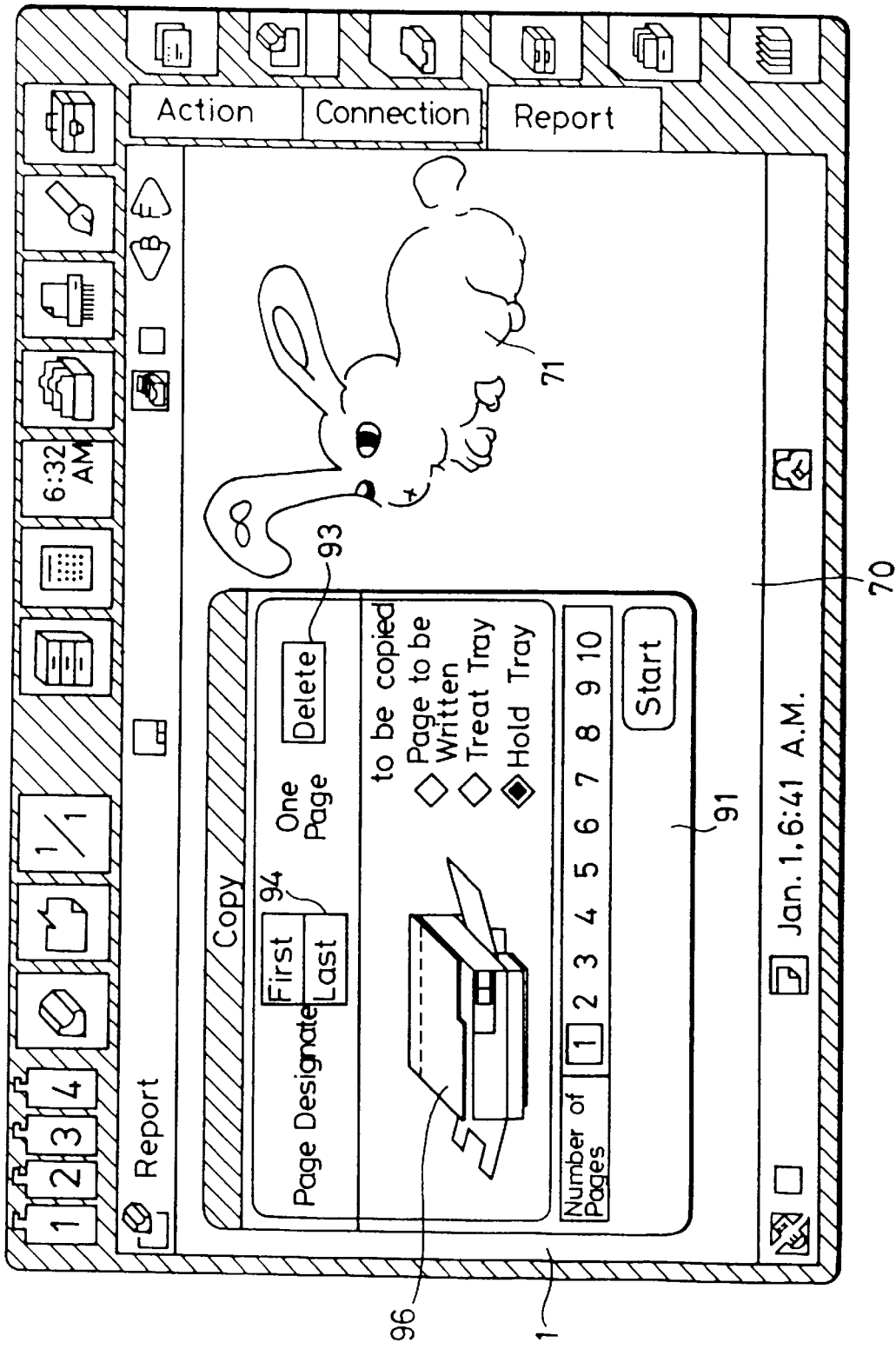
Figure 6G:
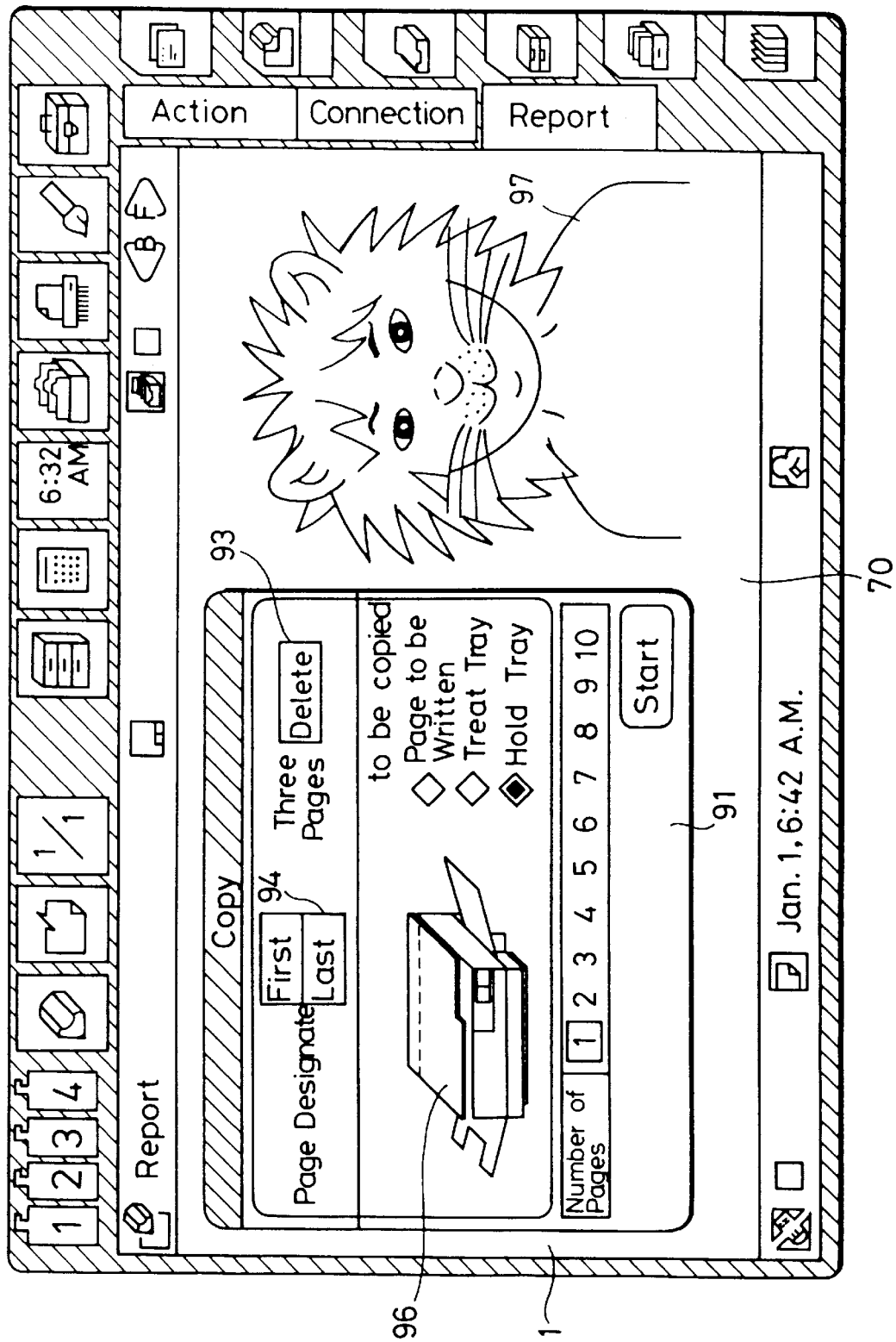

While the pages are being turned over, the copy image 91 remains unchanged as shown in FIG. 6E, which shows that no pages are turned over. Then, the CPU 21 determines in a step STE7 whether the "FIRST" key 92 is touched by the stylus 3 or not. If not, then control returns through another processing step STE8 to the step STE7 again. If the "FIRST" key 92 is touched by the stylus 3 in the step STE7, then control goes to a step SE9 in which the "LAST" key 94 and the "CANCEL" key 93 in the copy image 91 are enabled as shown in FIG. 6F. FIG. 6F shows a display condition in which the B key 75 or the F key 76 is about to be touched to turn over pages. The number of pages to be copied is set to "1" in a step STE10, and then the first address of the displayed page is stored in a memory X in a step STE11. Thereafter, the CPU 21 determines in a step STE12 whether the B key 75 or the F key 76 is touched by the stylus 3 or not. If the B key 75 is touched by the stylus 3, then the displayed segment or page number is decremented by 1 in a step STE13 (FIG. 2B), and the B counter associated with the B key 75 is incremented by 1 in a step STE14. Then, the sum of 1 and the absolute value |B−F| representing the difference between the counts of the B and F counters is displayed as the page number in a step STE15. FIGS. 6F and 6G show that the displayed pages are turned over to the first and third pages, respectively. Control then goes from the step STE15 back to the step STE12. If the F key 76 is touched by the stylus 3 in the step STE12, then the displayed segment or page number is incremented by 1 in a step STE16, and the F counter associated with the F key 76 is incremented by 1 in a step SET17. Then, the sum of 1 and the absolute value |B−F| representing the difference between the counts of the B and F counters is displayed as the page number in a step STE18. Control then goes from the step STE18 back to the step STE12.

Figure 2A:
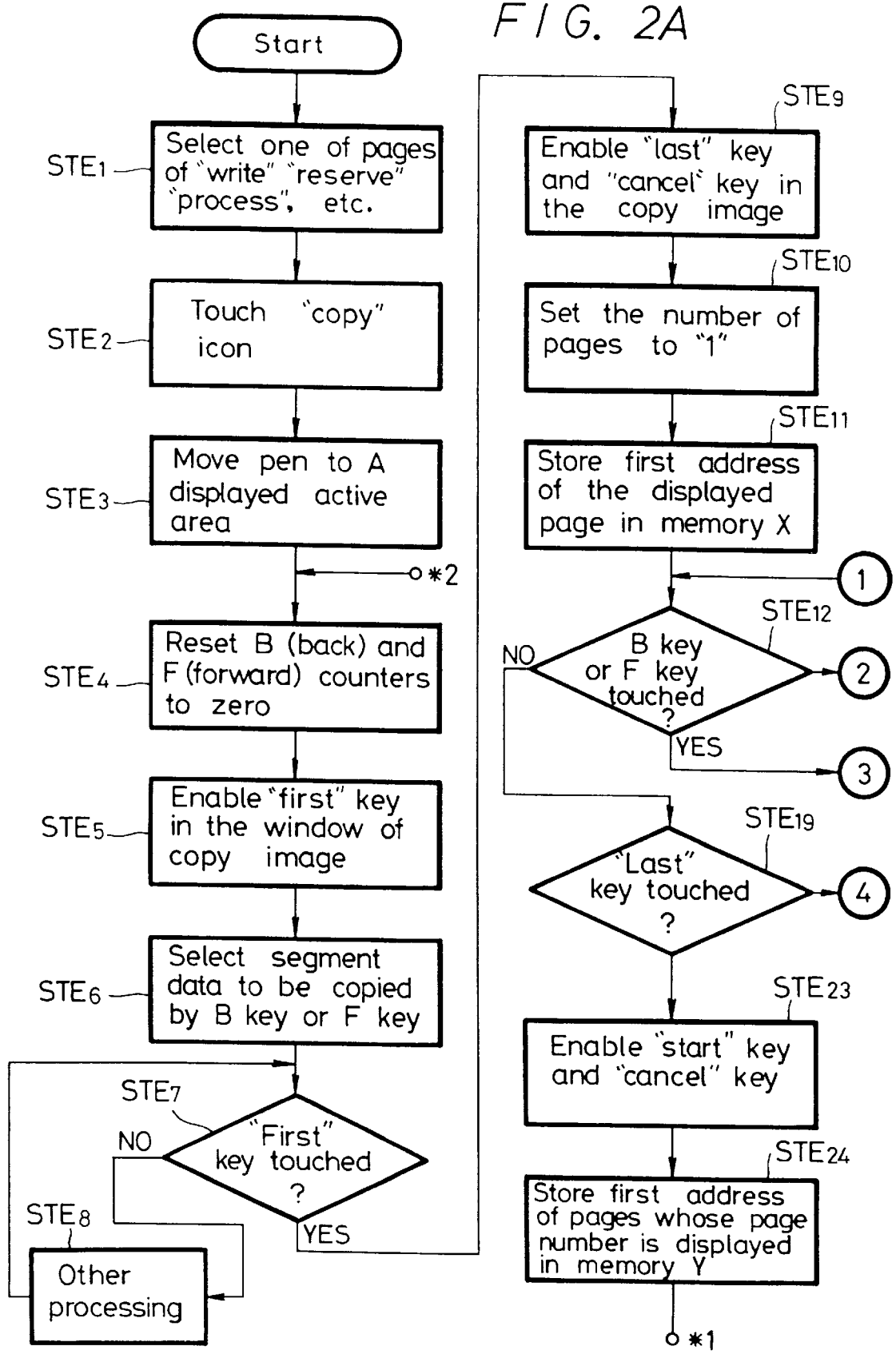
FIGS. 2A, 2B, and 2C are a flowchart of an operation sequence of an information processing apparatus according to another embodiment of the present invention.
Figure 2B:
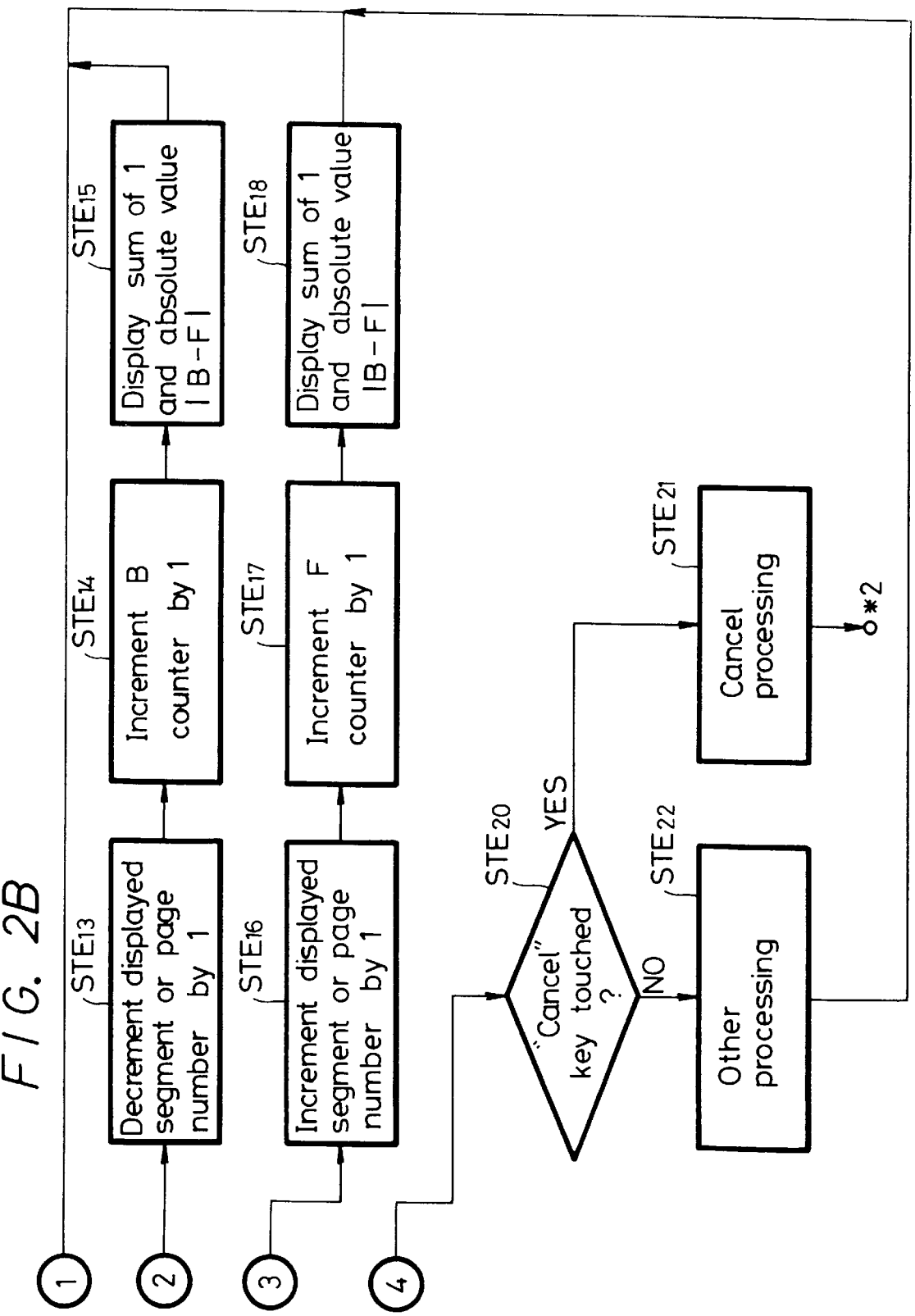
Figure 2C:
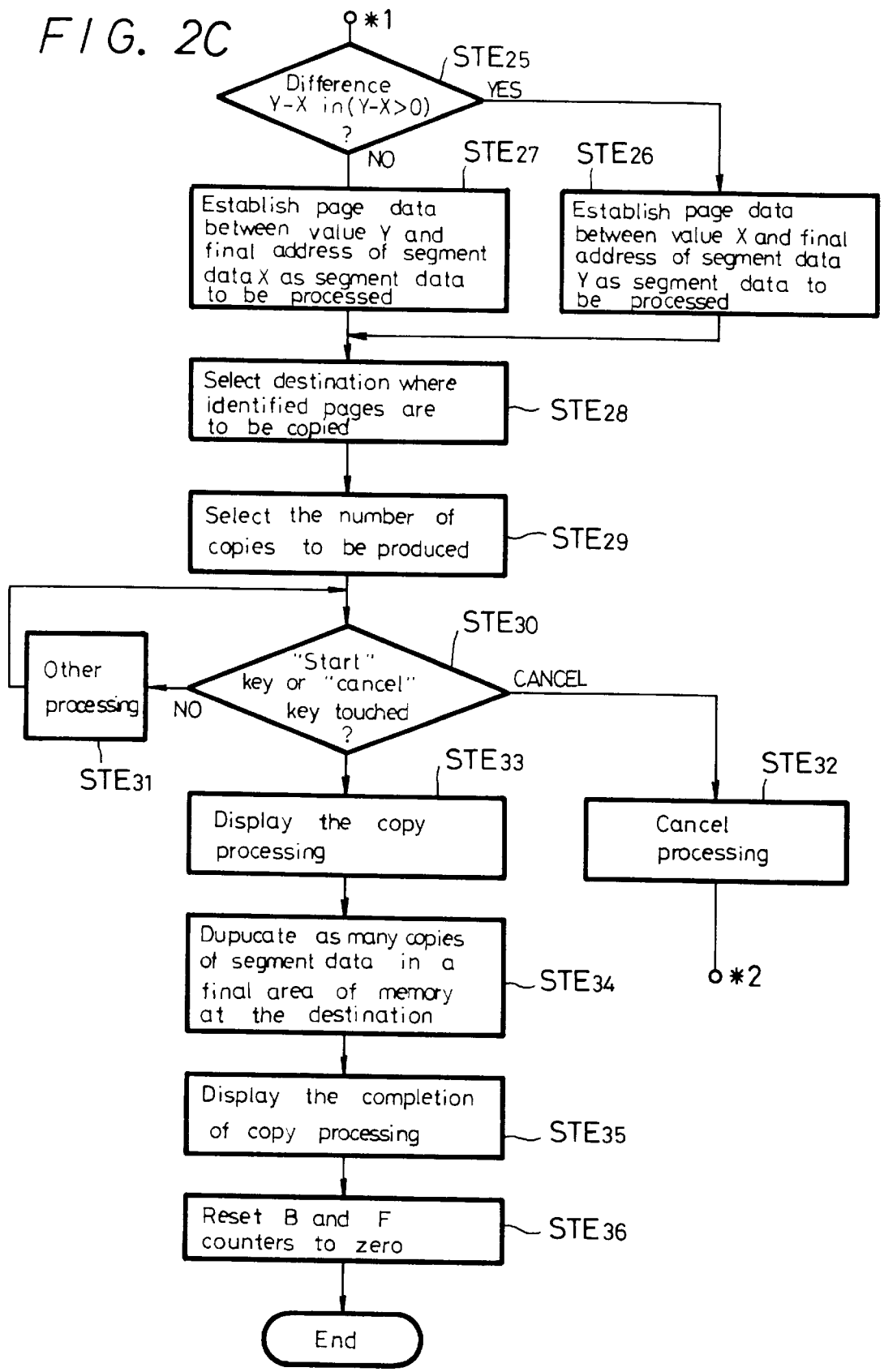
Figure 6H:
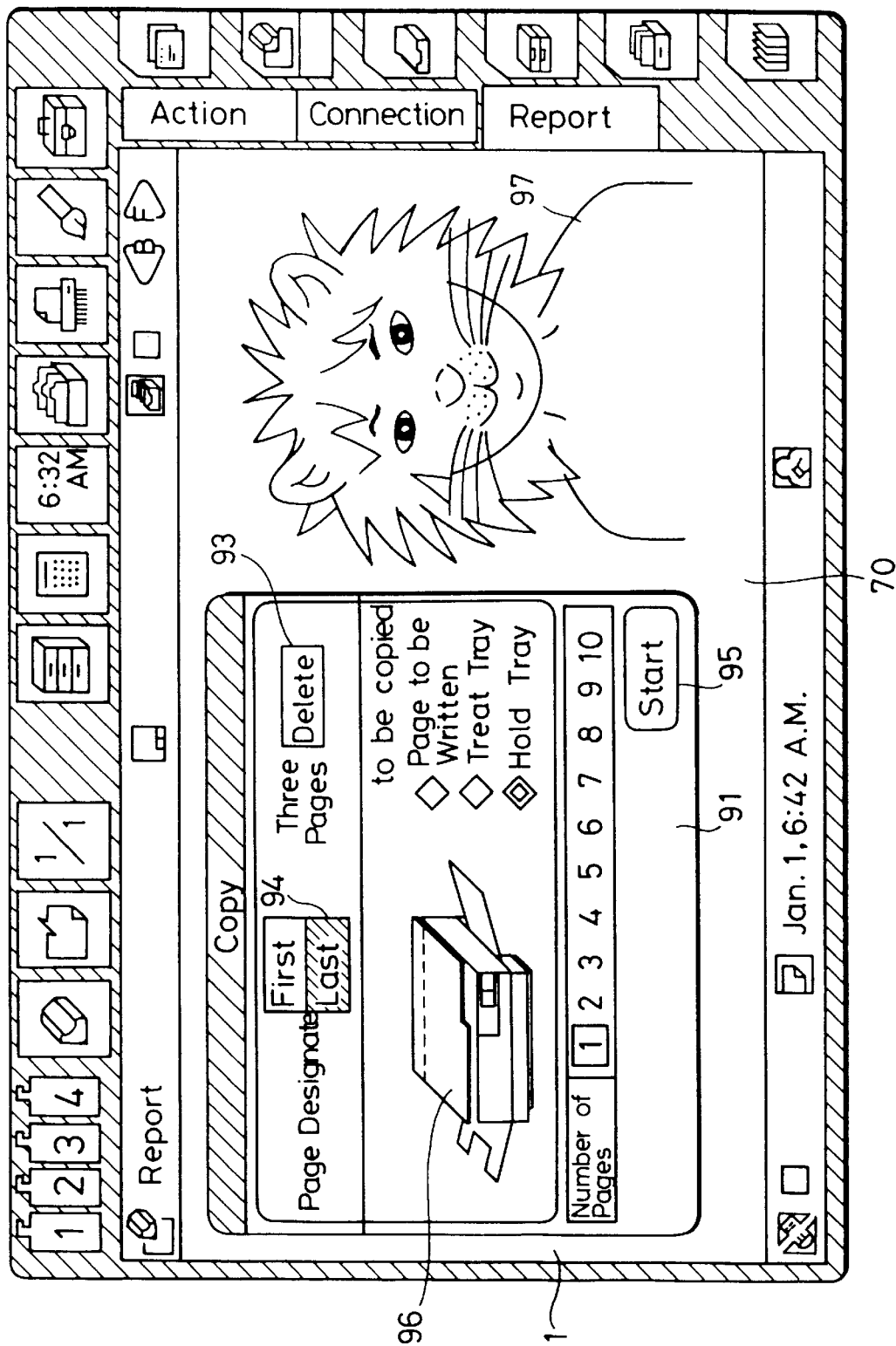
Figure 19:
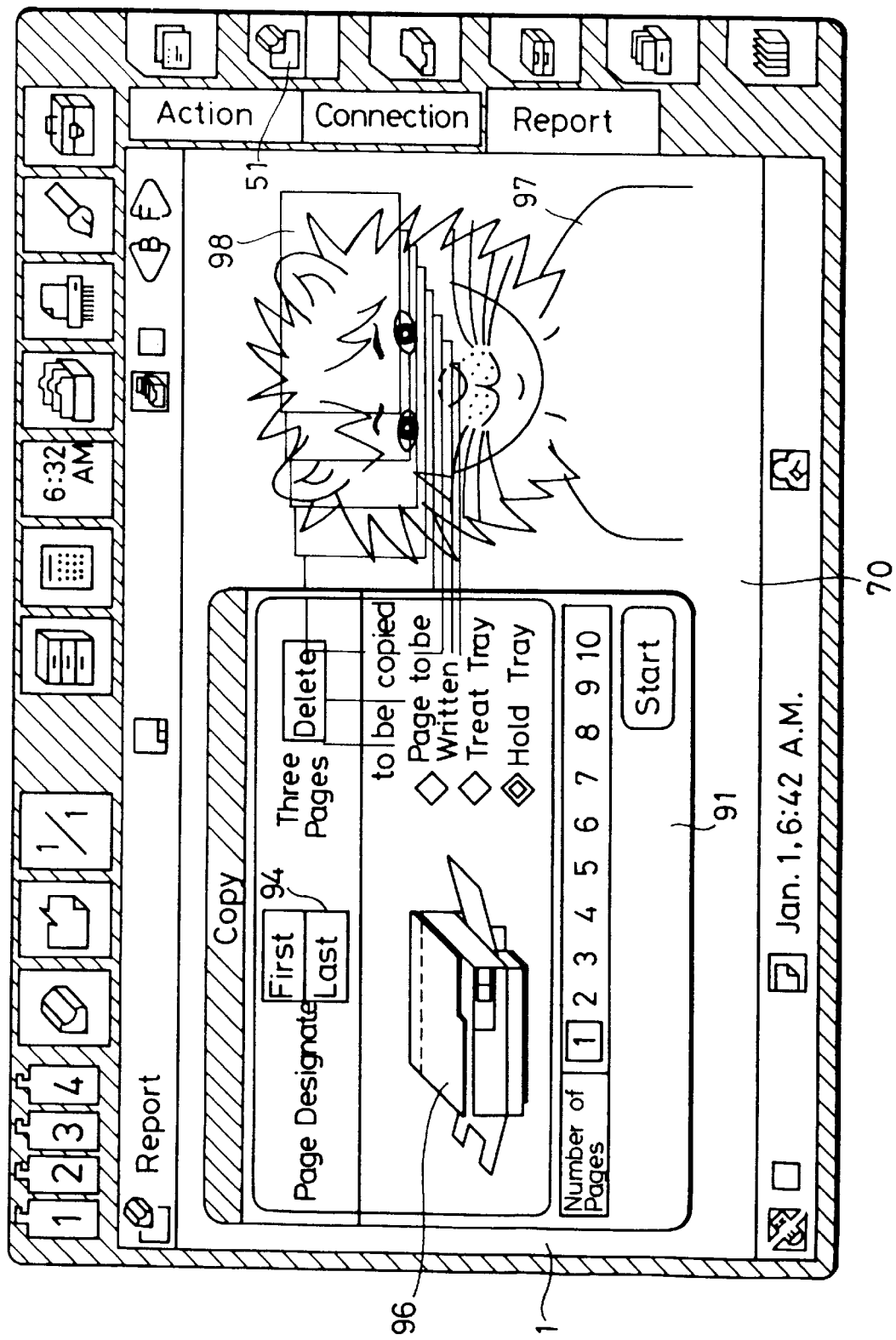

If neither the B key 75 nor the F key 76 is touched by the stylus 3 in the step STE12, then the CPU 21 determines in a step STE19 (FIG. 2A) whether the "LAST" key 94 is touched by the stylus 3 or not. If not, then the CPU 21 determines in a step STE20 (FIG. 2B) whether the "CANCEL" key 93 is touched by the stylus 3 or not. If the "CANCEL" key 93 is touched by the stylus 3, then the process is canceled in a step STE21. After the step SE21, control returns to the step STE4. If the "CANCEL" key 93 is not touched by the stylus 3 in the step STE20, then control goes through another processing step STE22 back to the step STE12. If the "LAST" key 94 is touched by the stylus 3 in the step SE19, as shown in FIG. 6H, then only the "START" key 95 and the "CANCEL" key 93 are enabled in a step STE23 (FIG. 2A). Then, the CPU 21 stores the first address of the page whose page number is displayed in the copy image 91 in a memory Y in a step STE24. The CPU 21 determines in a step STE25 (FIG. 2C) whether the difference Y−X between the first addresses in the memories X, Y is positive (Y−X>0) or not. If the difference Y−X is positive, then the page data between the value X in the X memory and the final address of the segment data starting with the value Y in the memory Y are established as the segment data to be copied in a step STE26. If the difference Y−X is negative, then the page data between the value Y in the memory Y and the final address of the segment data starting with the value X in the memory X are established as the segment data to be copied in a step STE27.

The steps STE26, STE27 are described in more detail below. If, for example, successive second and third segment data or pages among first through fourth segment data or pages are to be copied, then the first address (i.e., "9020") of the second page is stored in the memory X in the step STE11, and the first address of the third page (i.e., "9080") is stored in the memory Y in the step STE24. The step STE25 determines whether Y−X=9080−9020=60 is positive or not. If the difference Y−X is positive in the step STE25, the segment data or page data between the value X, i.e., the first address 9020 of the second page and the final address of the page starting with the value Y, i.e., the first address 9080 of the third page are established as the pages to be copied. Therefore, the second and third pages are established as the pages to be copied. If the difference Y−X is negative in the step STE27, then the third and second pages are set as the pages to be copied.

Figure 6J:
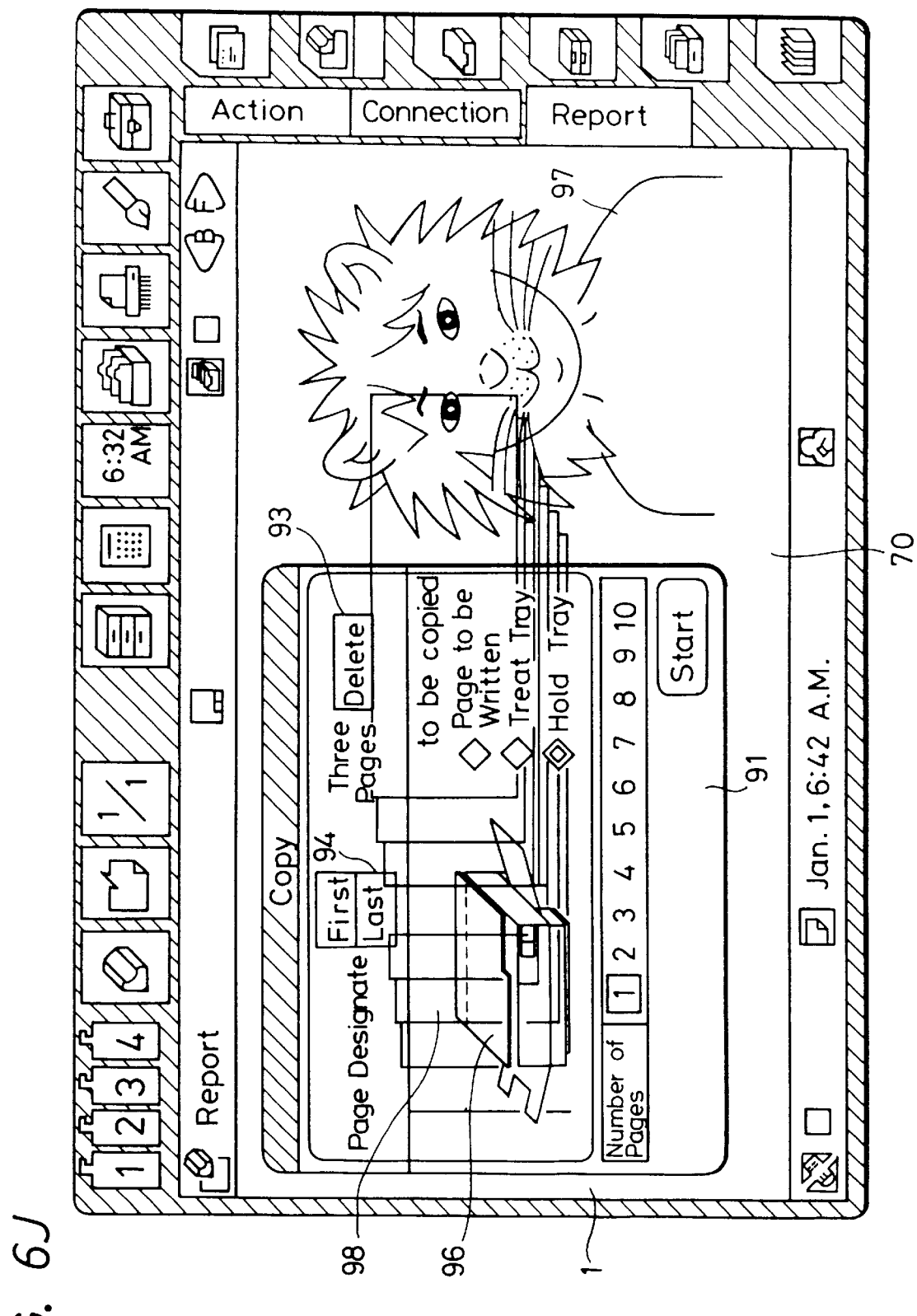
Figure 6K:
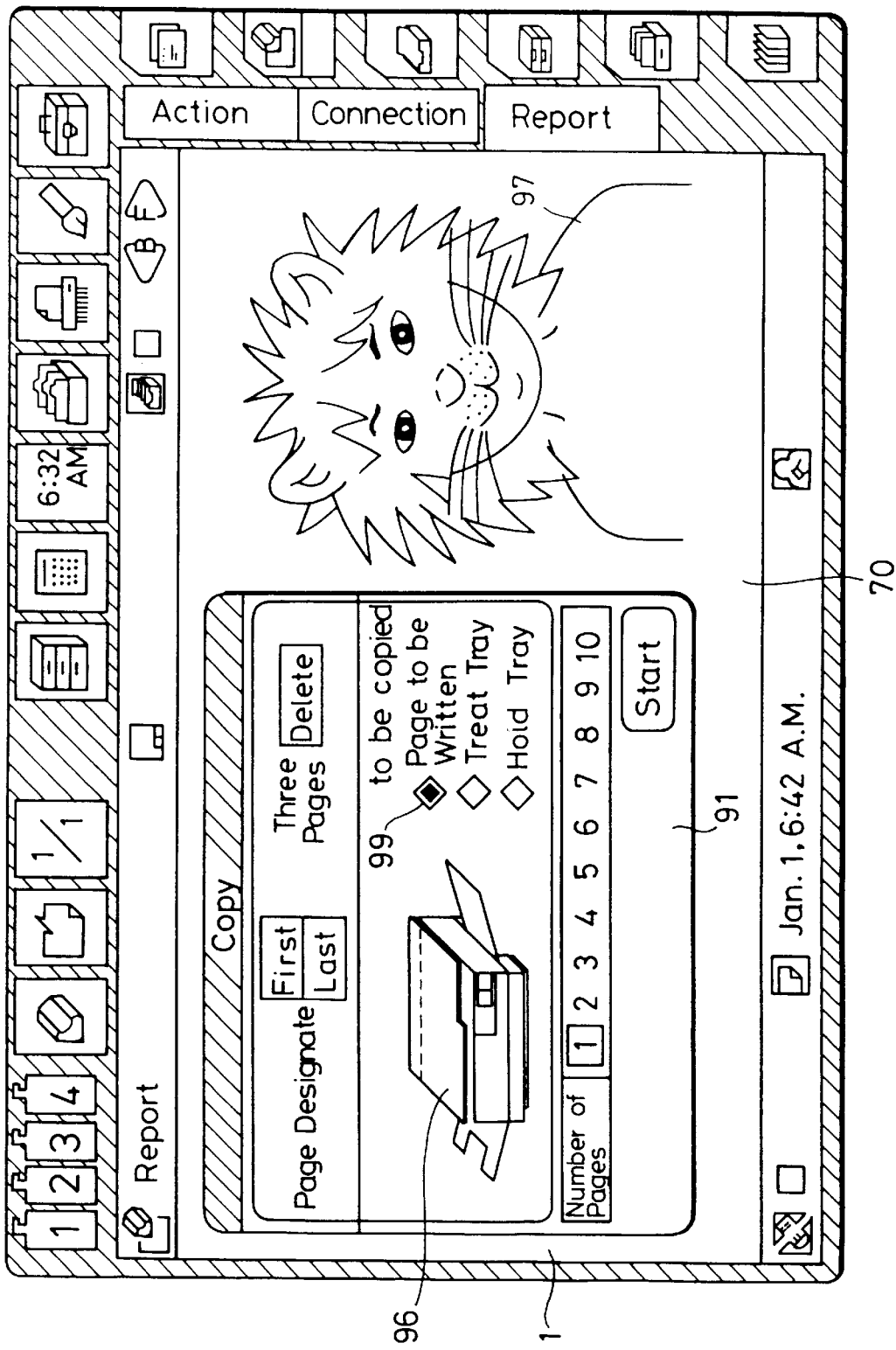
Figure 79:
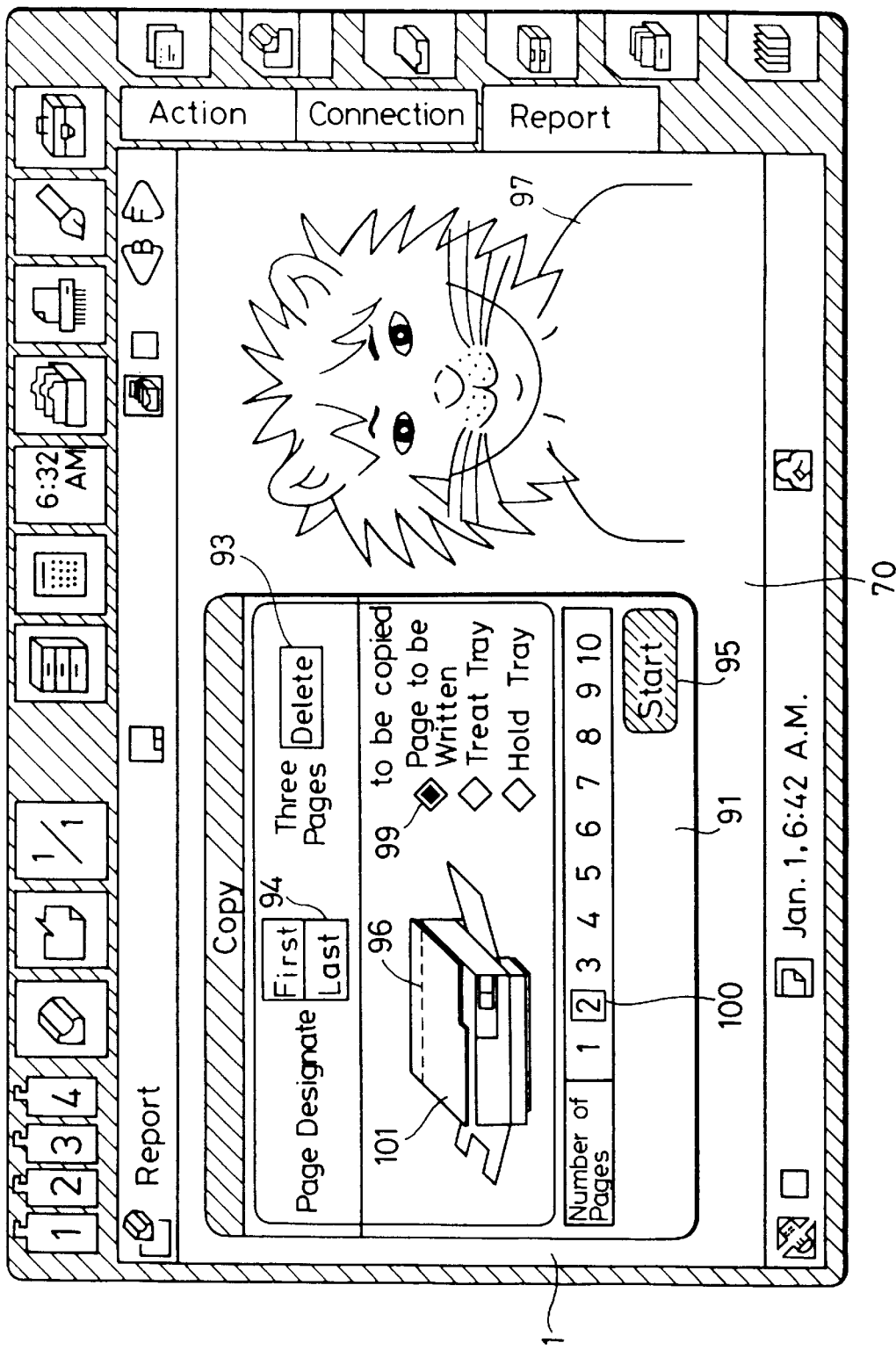
Figure 6M:
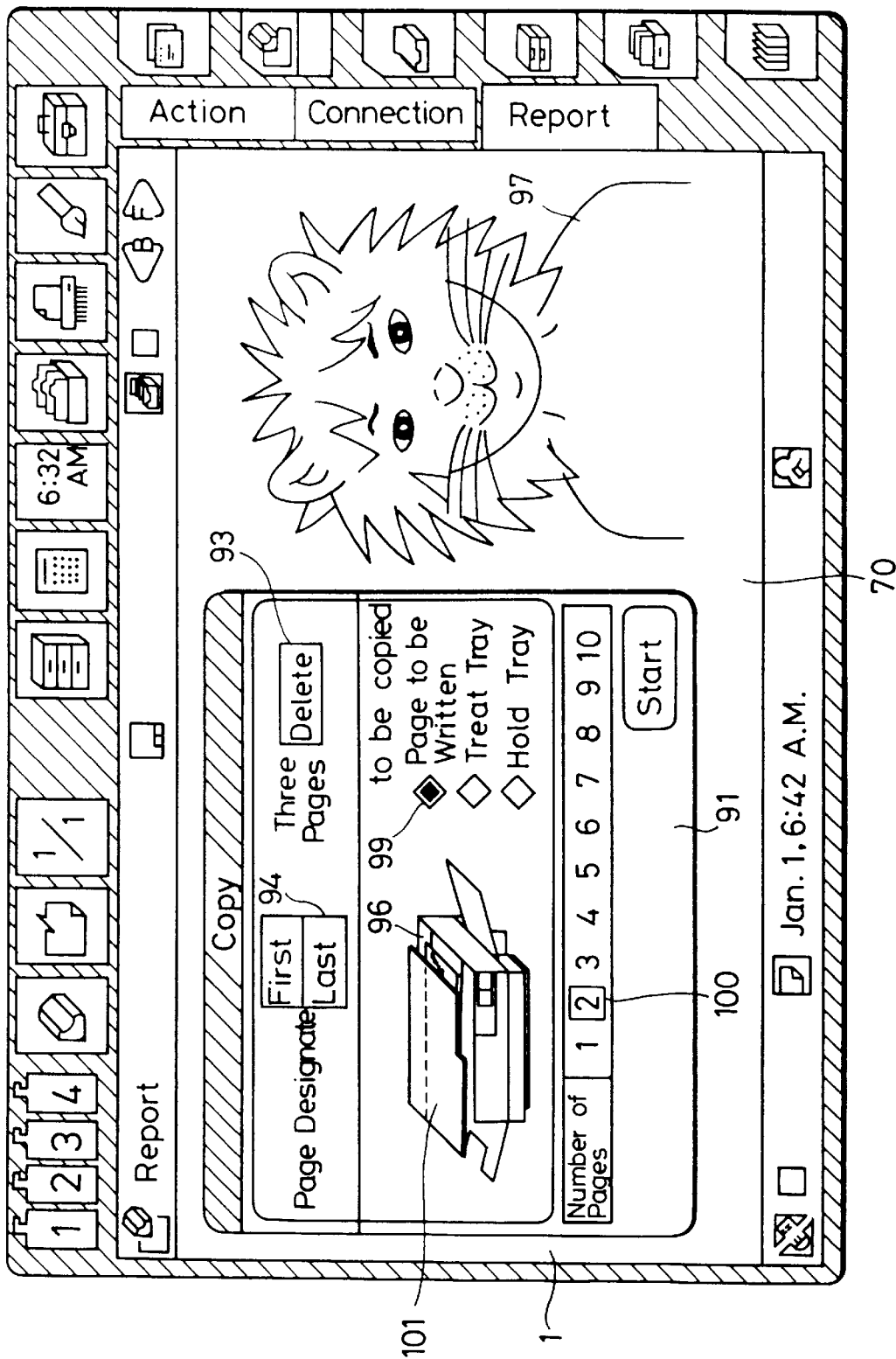
Figure 60:
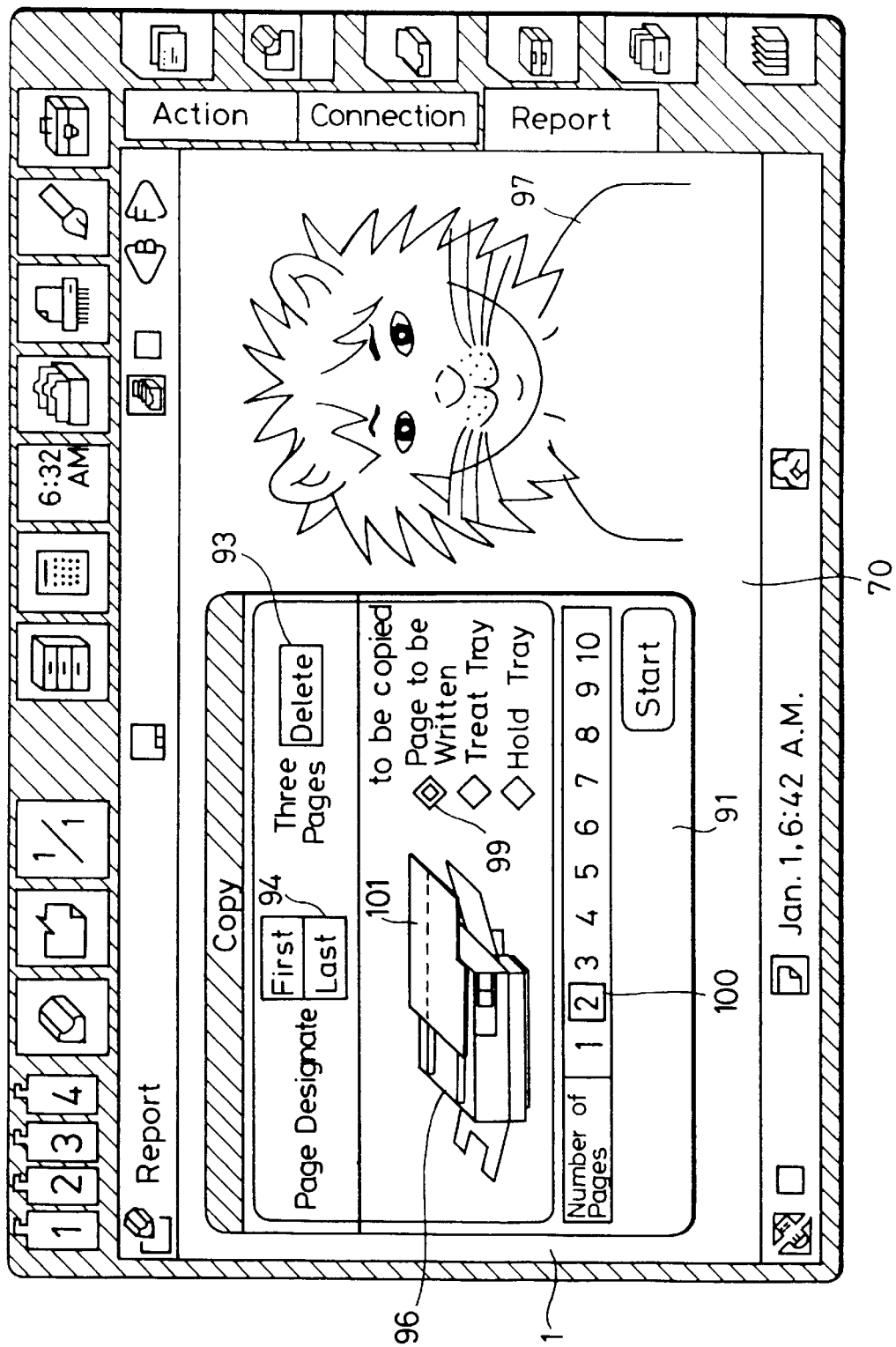
Figure 6P:
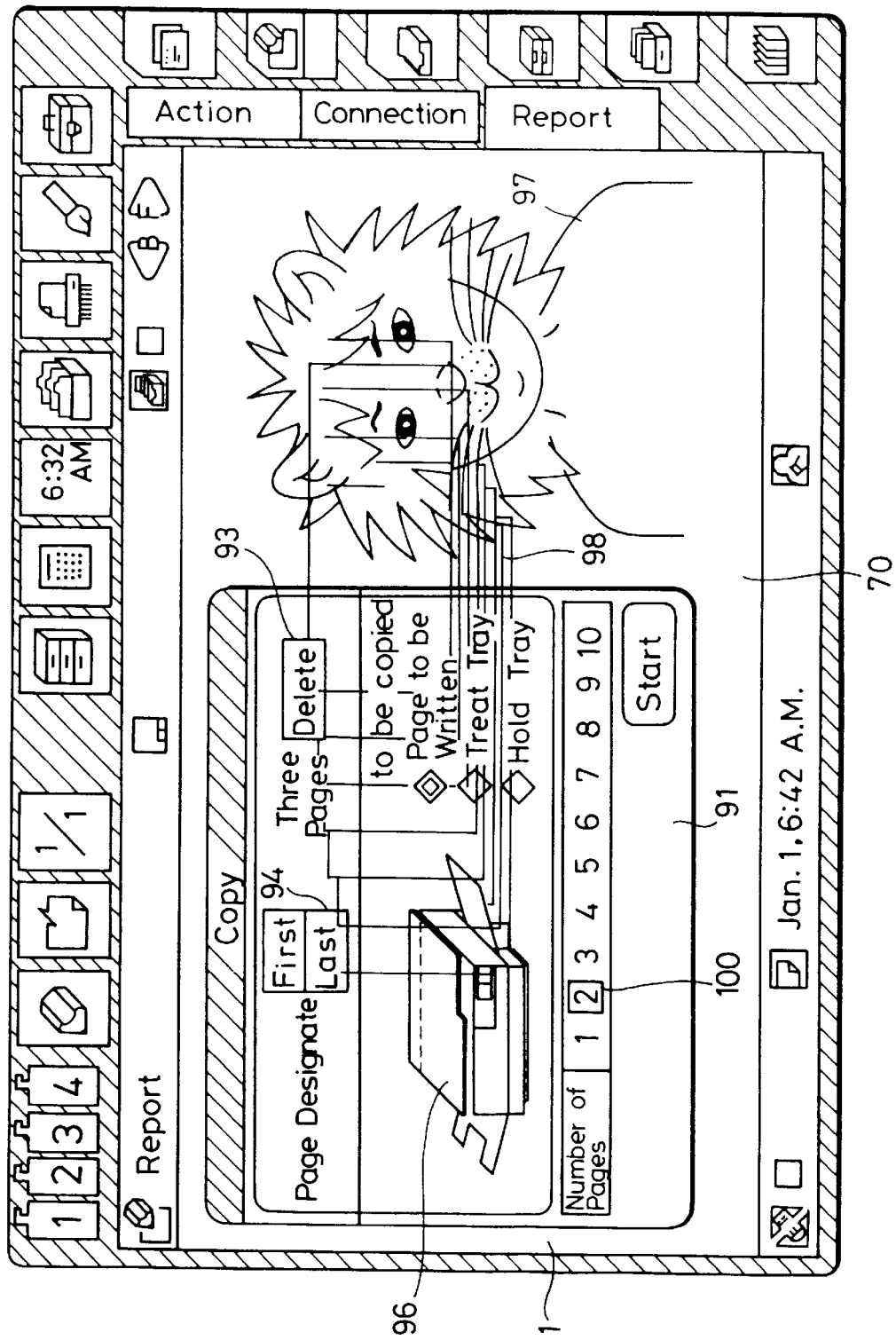
Figure 6Q:
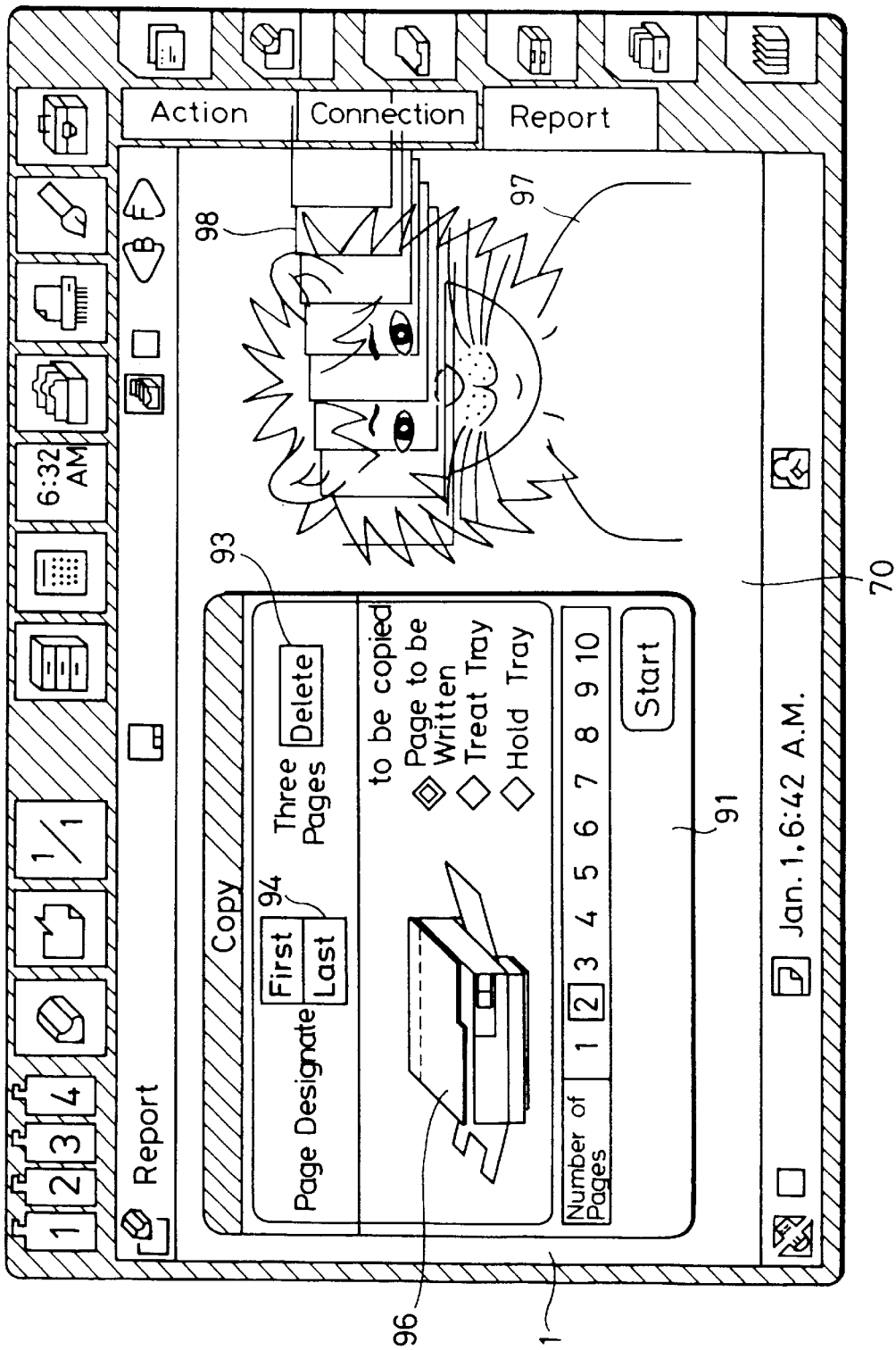
Figure 6R:
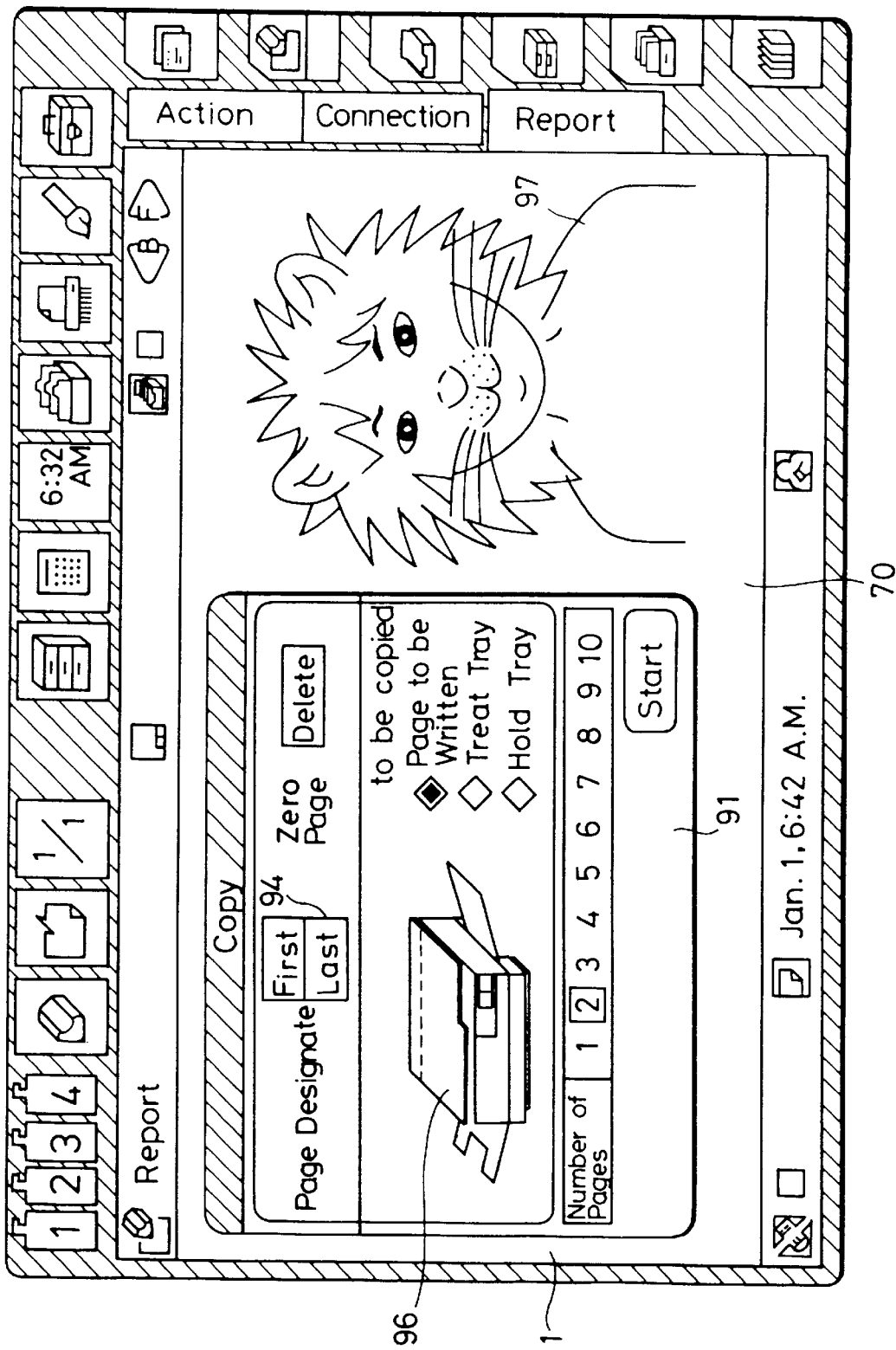

After the successive segment data to be copied are specified in the step ST26 or ST27 and sheets to be printed are set in position, the stylus 3 touches the "LAST" key 94, as shown in FIG. 6H. Immediately thereafter, the display unit 1 displays segment data 98, to be successively copied, as they move from the "WRITE" icon 51 toward the displayed copier 96 in the copy image 74. With the "LAST" key 94 finally touched by the stylus 3, the displayed segment data 98 are displayed over the copier 96, as shown in FIG. 6J. Then, a destination where the identified pages are to be copied is selected in a step STE28. For example, the stylus 3 is put in contact with a displayed WRITE PAGE 99 as shown in FIG. 6K. Then, the number of copies to be produced is selected in a step STE29. For example, a displayed key 100 (FIG. 6L) representing "2" is touched by the stylus 3, and the "START" key 95 is touched by the stylus 3. Then, the CPU 21 determines in a step STE30 whether the key touched by the stylus 3 is the "START" key 95 or the "CANCEL" key 93. If either the key 95 or the key 93 is not touched by the stylus 3, then the CPU 21 executes another processing step STE31 and executes the step STE30 again. If the "CANCEL" key 93 is touched by the stylus 3 in the step STE30, then the process is canceled in a step STE32, after which control returns to the step STE4. If the "START" key 80 is touched by the stylus 3 in the step ST30, the "START" key 95 is displayed in a hatched mode, indicating that the "START" key 95 is activated, as shown in FIG. 6L. The copying process now starts to be executed. As shown in FIGS. 6L through 60, a sliding panel 101 of the displayed copier 96 is moved back and forth, indicating that the segment data are copied. After the movement of the sliding panel 101 is finished, the copied segment data 98 move toward the "WRITE" icon 51 and are absorbed by the "WRITE" icon 51, as shown in FIGS. 6P and 6Q, indicating the copying process, in a step STE33. In a step STE34, as many copies of the segment data as desired to be produced are duplicated in a final area of the memory at the destination. The completion of the copying process is then displayed in a step STE34 as shown in FIG. 6R. The B and F counters are reset to zero in a step ST35. The program for the copying process is now finished.

As described above, desired successive segment data or pages in storage can easily be retrieved and canceled or copied using the stylus 3, while permitting the user to visually confirm the shredding or copying process.

Having described preferred embodiments of the invention with reference to the accompanying drawings, it is to be understood that the invention is not limited to the precise embodiments and that various changes and modifications could be effected by one skilled in the art without departing from the spirit or scope of the invention as defined in the appended claims.

What is claimed is:

1. An information processing apparatus comprising:

(a) data input means comprising a pen and a tablet for inputting information;

(b) memory means for storing said information input by said data input means;

(c) processing means for processing said information in a form of plural pages;

(d) display means for displaying a plurality of icons and for displaying a page of said information;

(e) means responsive to said pen for designating a currently displayed page as a first page of a sequence of pages which is an object of a predetermined process;

(f) means responsive to said pen for changing a displayed page so as to select a previous (back) or next (forward) page for display;

(g) means responsive to said pen for designating a currently displayed page as a last page of said sequence;

(h) means responsive to said pen for starting said predetermined process from said first page to said last page in said sequence of pages;

(i) means for storing plural descriptive images designating said predetermined process including an image of a machine for performing the process;

(j) means for controlling said means for storing so as to display said descriptive images successively as a series of moving images to visually represent documents moving in relation to said image of a machine, to graphically simulate performing said predetermined process.

2. An information processing apparatus according to claim 1, wherein each of said designating means comprises a key displayed by said display means.

3. An information processing apparatus according to claim 1, wherein said processing means comprises means for processing the information in a selected one of a plurality of different selectable processing modes, said display means comprising means for displaying a window indicating the selected processing mode.

4. An information processing apparatus according to claim 3, wherein both of said designating means comprises a key contained in said window displayed by said display means.

5. An information processing apparatus according to claim 1, wherein said processing means comprises means for copying the information ranging from said first page to said last page as different pages in said memory means.

6. An information processing apparatus according to claim 1, wherein said display means comprises means for displaying the number of pages ranging from said first page to said last page.

7. An information processing apparatus according to claim 1, wherein said processing means comprises means for deleting the information ranging from said first page to said last page from said memory means.

8. An information processing apparatus according to claim 1, wherein said input means comprising a tablet combined with said display means.

9. An information processing apparatus according to claim 8, wherein said processing means comprises means for processing the information in a selected one of a plurality of different selectable processing modes indicated by said icons, respectively, said display means comprising means for displaying a plurality of icons representing said processing modes, respectively, and means for displaying a window indicating the selected processing mode, and wherein said input means further comprises a stylus operable in coaction with said tablet to select one of said processing modes by touching the corresponding icon and moving into said window.

10. An information processing apparatus according to claim 1, wherein said different selectable processing modes comprise a deleting mode for deleting the information ranging from said first page to said last page from said memory means, and a copying mode for copying the information ranging from said first page to said last page as different pages in said memory means, said movable images representing a shredder and a copier, respectively, associated with said deleting and copying modes.

11. An information processing apparatus according to claim 1, wherein said information processing apparatus is a portable computerized electronic data storage device.

* * * * *